United States Patent
Vastmans et al.

(10) Patent No.: US 9,892,614 B2
(45) Date of Patent: *Feb. 13, 2018

(54) OPTICAL SENSOR, OPTICAL SENSOR ASSEMBLY AND MONITORING DEVICE

(71) Applicants: COMMSCOPE CONNECTIVITY BELGIUM BVBA, Kessel-Lo (BE); ADC TELECOMMUNICATIONS (SHANGHAI) DISTRIBUTION CO., LTD., Shanghai (CN); ADC CZECH REPUBLIC, s.r.o., Brno (CZ)

(72) Inventors: Kristof Vastmans, Boutersem (BE); David Novak, Trest (CZ); Daniel Francois Daems, S-Gravenwezel (BE); Zhaoyang Tong, Shanghai (CN); Lin Lin, Shanghai (CN)

(73) Assignees: CommScope Connectivity Belgium BVBA, Kessel-Lo (BE); ADC Telecommunications (Shanghai) Distribution Co, Ltd., Shanghai (CN); ADC Czech Republic, s.r.o., Brno (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,920

(22) Filed: Aug. 21, 2017

(65) Prior Publication Data
US 2017/0345278 A1 Nov. 30, 2017

Related U.S. Application Data

(63) Continuation of application No. 14/890,586, filed as application No. PCT/EP2014/059733 on May 13, 2014, now Pat. No. 9,741,229.

(Continued)

(30) Foreign Application Priority Data

Jun. 6, 2013 (CN) .......................... 2013 1 0223485

(51) Int. Cl.
*G01T 1/16* (2006.01)
*G01T 1/166* (2006.01)
(Continued)

(52) U.S. Cl.
CPC ............. *G08B 21/18* (2013.01); *G01D 5/264* (2013.01); *G01M 11/088* (2013.01); *G01M 11/3154* (2013.01); *G01D 5/268* (2013.01)

(58) Field of Classification Search
CPC ...................................................... G08B 21/18
See application file for complete search history.

(56) References Cited

U.S. PATENT DOCUMENTS 5,144,689 A 9/1992 Lovely
5,657,405 A * 8/1997 Fujiwara ................ G01D 5/268
356/225

(Continued)

FOREIGN PATENT DOCUMENTS

CN 101965367 A 2/2011
GB 2201508 A 9/1988
WO 2009111820 A1 9/2009

OTHER PUBLICATIONS

International Search Report for International Application No. PCT/EP2014/059587 dated Aug. 28, 2014 (5 pages).

(Continued)

*Primary Examiner* — Joseph Feild
*Assistant Examiner* — Pameshanand Mahase
(74) *Attorney, Agent, or Firm* — Merchant & Gould P.C.

(57) ABSTRACT

An optical sensor (100) comprises: a holding sleeve (11); a fixed ferrule (12) fixedly mounted in said holding sleeve (11); a movable ferrule (13) movably mounted in said holding sleeve (11), a predetermined distance existing between a first movable end of said movable ferrule (13) and a first fixed end of said fixed ferrule (12) in said holding (Continued)

sleeve (11); a reflection part (14) arranged at a second movable end of said movable ferrule (13) opposite to said first movable end, for reflecting light entering the movable ferrule (13); and an actuation part (15), said actuation part (15) being constructed to drive said movable ferrule (13) to move so that said first movable end moves towards said first fixed end. An optical sensor assembly and a monitoring device comprising the optical sensor (100), or another sensor (1012) can remotely detect a mechanical movement in a passive mode. A first reflector (14, 1016) is configured to provide a first reflected optical signal. The sensor (100, 1012) is connected to the first reflector and has a first position and a second position, the second position configured to attenuate the first reflected optical signal more than the first position. The sensor is configured to move between the first and second positions in response to a monitored parameter (1018).

19 Claims, 20 Drawing Sheets

Related U.S. Application Data

(60) Provisional application No. 61/822,655, filed on May 13, 2013.

(51) Int. Cl.
*G08B 21/18* (2006.01)
*G01M 11/00* (2006.01)
*G01D 5/26* (2006.01)
*G01M 11/08* (2006.01)

(56) References Cited

U.S. PATENT DOCUMENTS

| | | |
|---|---|---|
| 5,684,671 A | 11/1997 | Hobbs et al. |
| 6,870,975 B1* | 3/2005 | Morison ............ G01D 5/35303 356/480 |
| 6,927,690 B2 | 8/2005 | Wilson |
| 7,060,965 B2* | 6/2006 | Vidovic ................ G01D 5/268 250/227.14 |
| 7,224,465 B2 | 5/2007 | Balachandran et al. |
| 7,514,670 B2 | 4/2009 | Anderson et al. |
| 7,782,196 B2 | 8/2010 | Piper, Sr. et al. |
| 7,852,213 B2 | 12/2010 | Browning, Jr. et al. |
| 7,956,316 B2 | 6/2011 | Browning, Jr. et al. |
| 8,368,534 B2 | 2/2013 | Crutcher et al. |
| 8,965,150 B2 | 2/2015 | Crutcher et al. |
| 2005/0146726 A1 | 7/2005 | Balachandran |
| 2013/0279920 A1* | 10/2013 | Herzog .................... G02B 6/36 398/212 |

OTHER PUBLICATIONS

International Written Opinion for International Application No. PCT/EP2014/059587 dated Aug. 28, 2014 (14 pages).

* cited by examiner

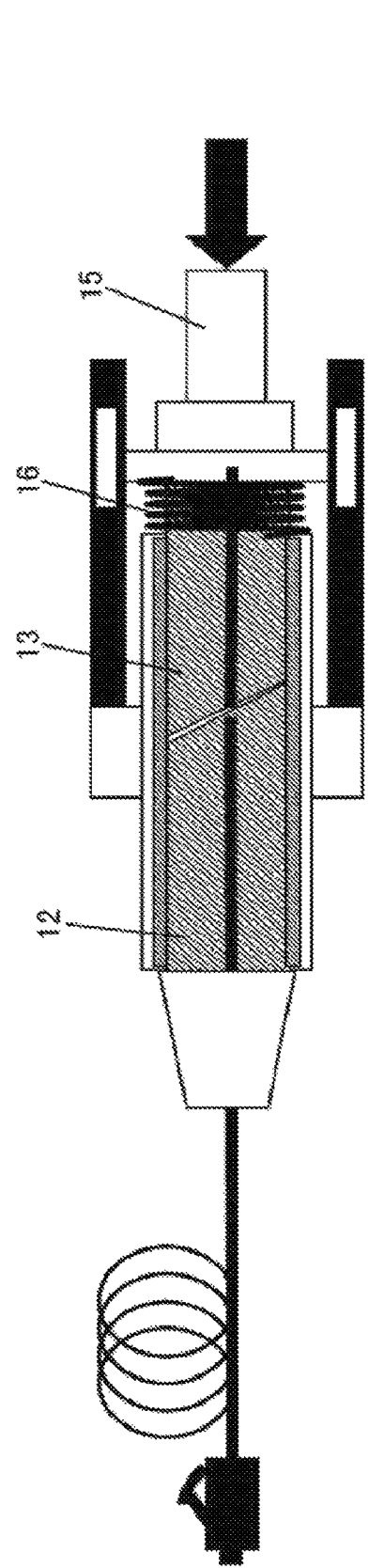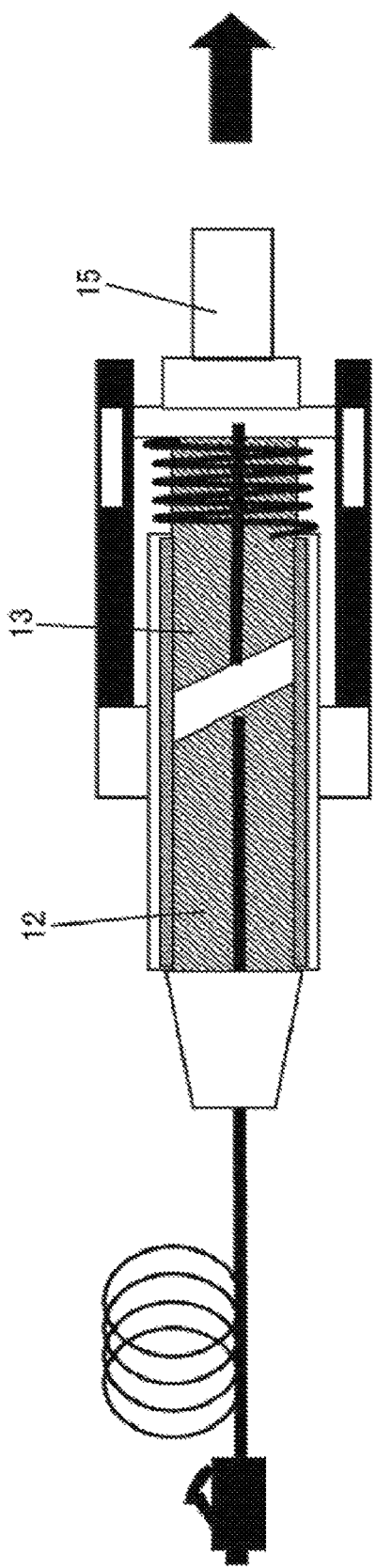

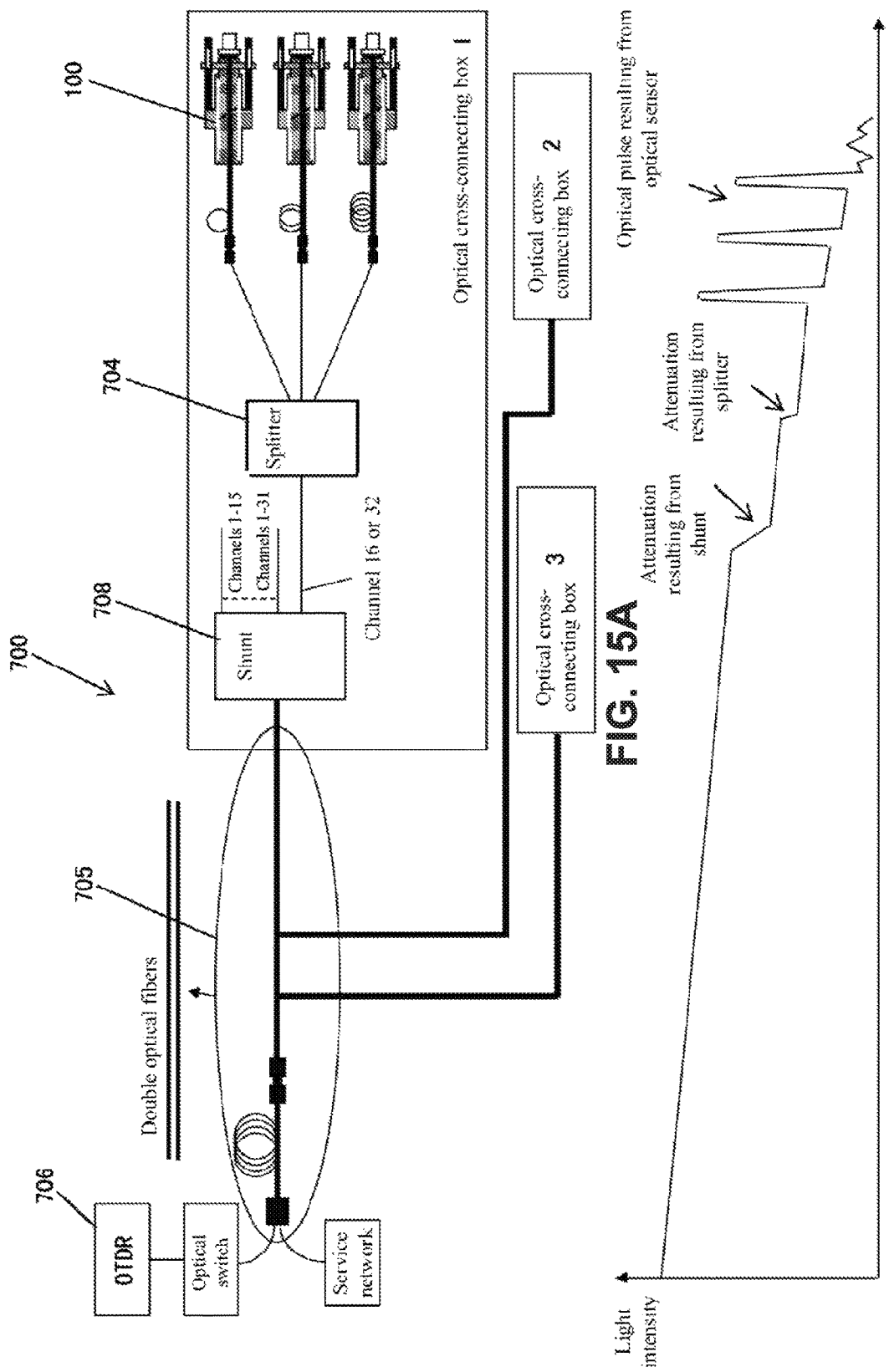

OPTICAL SENSOR, OPTICAL SENSOR ASSEMBLY AND MONITORING DEVICE

CROSS-REFERENCE TO RELATED APPLICATION(S)

This application is a continuation of U.S. patent application Ser. No. 14/890,586 filed on Nov. 11, 2015, which is a National Stage of PCT/EP2014/059733, filed 13 May 2014, which claims benefit of U.S. Patent Application Ser. No. 61/822,655 filed on 13 May 2013, and Chinese Patent Application No. 201310223485.6 filed on 6 Jun. 2013. The disclosures of all the applications above are incorporated herein by reference in their entireties. To the extent appropriate, a claim of priority is made to each of the above disclosed applications.

TECHNICAL FIELD

The present invention relates to an optical sensor, in particular an optical sensor capable of sensing mechanical movement, and an optical sensor assembly and a monitoring device having the optical sensor.

BACKGROUND ART

A variety of sensors capable of sensing mechanical movement have been developed. However, if a result sensed by a sensor is transmitted to a monitoring room far away from a detection site, for example when the detection site is more than hundreds of or thousands of meters away from the monitoring room, the detection result is generally required to be transmitted to the monitoring room through an electrical wire.

For example, in an optical cable communication system, a field optical cross-connecting box relatively far away from places of activity of people is generally used to protect intermediate components such as an optical fiber connector, distributor and adapter in the optical cable communication system. In some cases, the cross-connecting box may be opened accidentally, or opened due to technical personnel or engineering personnel forgetting to close it, or opened due to being impacted or stolen. In these unwanted abnormal cases of opening, the optical cross-connecting box cannot provide protection for an optical fiber device therein.

Therefore, there is a need for a sensor which can detect the opening or closure of an optical cross-connecting box at any time, and a detection result is required to be transmitted to a monitoring room far away from the optical cross-connecting box. However, since the optical cross-connecting box is not provided with a power supply device, it is not suitable to use an electric sensor and to transmit a sensed electric signal through an electrical wire.

SUMMARY OF THE INVENTION

A technical problem solved by the present invention is to provide an optical sensor and an optical sensor assembly comprising the optical sensor, which can remotely detect mechanical movement in a passive mode.

The present invention further provides a monitoring device comprising the optical sensor assembly, for remotely monitoring a mechanical position of a certain part of a monitored object.

According to an embodiment of an aspect of the present invention, an optical sensor is provided which comprises: a holding sleeve; a fixed ferrule fixedly mounted in said holding sleeve; a movable ferrule movably mounted in said holding sleeve, a predetermined distance existing between a first movable end of said movable ferrule and a first fixed end of said fixed ferrule in said holding sleeve; a reflection part arranged at a second movable end of said movable ferrule opposite to said first movable end, for reflecting light entering the movable ferrule; and an actuation part, said actuation part being constructed to drive said movable ferrule to move so that said first movable end moves towards said first fixed end.

The above optical sensor further comprises a reset device, which drives said movable ferrule to move against the force of said reset device.

In the optical sensor as described above, said reflection part is a reflection face formed on the second movable end of said movable ferrule. Said reflection face provides a reflection characteristic independent of wavelength. Said reflection face can also provide a selective waveband reflection characteristic dependent on wavelength.

In the optical sensor as described above, said reflection part is formed on said actuation part, and is in sealed connection with said second movable end.

In the optical sensor as described above, a limiting part is arranged on one of said movable ferrule and the actuation part, and said limiting part is constructed to limit the distance of movement of said movable ferrule.

In the optical sensor as described above, the end surfaces of said first fixed end and said first movable end are constructed to be parallel with each other and form an angle relative to an axis of the holding sleeve.

In the optical sensor as described above, the end surfaces of said first fixed end and said first movable end are inclined by 5°-10° relative to the axis of the holding sleeve.

Said optical sensor further comprises: a main body frame, said holding sleeve being arranged in said main body frame; and a guide frame mounted on said main body frame, said actuation part being movably mounted on said guide frame.

In the optical sensor as described above, said actuation part is provided with a guide protrusion, and said guide frame is provided with a guide groove matching with said guide protrusion.

The above optical sensor further comprises a housing, and said main body frame is mounted in said housing.

The above optical sensor further comprises a positioning frame mounted between said housing and said guide frame.

In the optical sensor as described above, said housing is connected to said actuation part through a flexible connection part so that said flexible connection part moves with said actuation part.

According to an embodiment of a still further aspect of the present invention, an optical sensor assembly is provided which comprises: an optical sensor as described in any one of the embodiments above; and an optical cable transmission device, constructed to be optically coupled to a second fixed end of said fixed ferrule, for transmitting light incident to said fixed ferrule and light reflected from said reflection part.

In the optical sensor assembly as described above, a first end of an optical cable of said optical cable transmission device is provided with a first optical fiber connector, and a second end of the optical cable of said optical cable transmission device is directly optically coupled with the second fixed end of said fixed ferrule.

In the optical sensor assembly as described above, a first end of an optical cable of said optical cable transmission device is provided with a first optical fiber connector, and a second end of the optical cable of said optical cable transmission device is optically coupled with the second fixed end of said fixed ferrule through a second optical fiber connector.

According to an embodiment of a further aspect of the present invention, a monitoring device is provided which comprises: at least one optical sensor assembly as described in any one of the embodiments above, the optical sensors of said optical sensor assembly being respectively mounted to at least one monitored object; and an optical time domain reflectometer, constructed to emit a main beam towards said optical sensors through an optical cable transmission device of the optical sensor assembly and receive a reflected beam reflected from said optical sensors, the optical path distances between said optical time domain reflectometer and the optical sensors being different from one another.

The monitoring device as described above further comprises: a shunt, constructed to separate at least one detection beam out of the main beam from said optical time domain reflectometer, each detection beam being transmitted to a corresponding optical sensor assembly.

The monitoring device as described above further comprises a splitter, which is constructed to split said detection beam into multiple detection sub-beams, each detection sub-beam being transmitted to a corresponding optical sensor assembly.

In the monitoring device as described above, said monitored objects are divided into multiple groups, and one shunt and at least one optical sensor assembly are arranged for each group of monitored objects.

Said monitoring device further comprises an optical switch, which is constructed to control one of said shunts to come into an operating state.

In the monitoring device as described above, said monitored objects are divided into multiple groups and at least one optical sensor assembly is arranged for each group of monitored objects; said monitoring device further comprises multiple splitters connected in series, wherein each splitter splits a detection beam from a previous stage into a main detection beam and a detection sub-beam, and each splitter is arranged in a propagation path of the detection main beam, each optical sensor receiving a corresponding detection sub-beam.

In the monitoring device as described above, the light flux ratio of the main detection beam and detection sub-beam output from each splitter is 20:80-1:99.

In the monitoring device as described above, the monitored object includes a field optical cross-connecting box.

According to an optical sensor, an optical sensor assembly and a monitoring device of the embodiments of the present invention as described above, the movement of an actuation device results in the contact of the end surfaces of the fixed ferrule and movable ferrule, so that a beam from the fixed ferrule is incident to the movable ferrule, and the incident beam is further reflected to the optical time domain reflectometer, so as to remotely detect mechanical movement in a passive mode and monitor a mechanical position of a certain part of the monitored object.

In accordance with aspects of the present disclosure, a passive optical sensor system is provided. In general, a reflected optical signal is attenuated in response to a monitored parameter, so that analyzing the reflected optical signal provides an indication of the parameter based upon the attenuation. In one example, a sensor system and method includes a first reflector configured to provide a first reflected optical signal. A sensor is connected to the first reflector and has a first position and a second position, the second position configured to attenuate the first reflected optical signal more than the first position. The sensor is configured to move between the first and second positions in response to a monitored parameter, thus changing the attenuation of the first reflected signal to provide an indication of the monitored parameter. The sensor system can be employed, for example, to monitor parameters of one or more enclosures.

DESCRIPTION OF THE DRAWINGS

The present invention will be described in more detail with reference to the drawings, in which:

FIG. 2A shows a sectional schematic view of the optical sensor shown in FIG. 1 when an actuator is not compressed;

FIG. 2B shows a sectional schematic view of the optical sensor shown in FIG. 1 when the actuator is compressed;

FIG. 15A shows a schematic view of a monitoring device according to a fourth exemplary embodiment of the present invention; FIG. 15B shows a curve diagram of light intensity acquired at an optical time domain reflectometer as a function of distance when the monitoring device shown in FIG. 15A operates;

DETAILED DESCRIPTION

Although the present invention will be fully described with reference to the drawings including preferred embodiments of the present invention, before the description, it is to be understood that those skilled in the art can modify the utility model described herein and achieve the technical effect of the present invention. Therefore, it is necessary to understand that the description above is a general disclosure for those skilled in the art and the content thereof is not intended to limit the exemplary embodiments described in the present invention.

Figure 1:
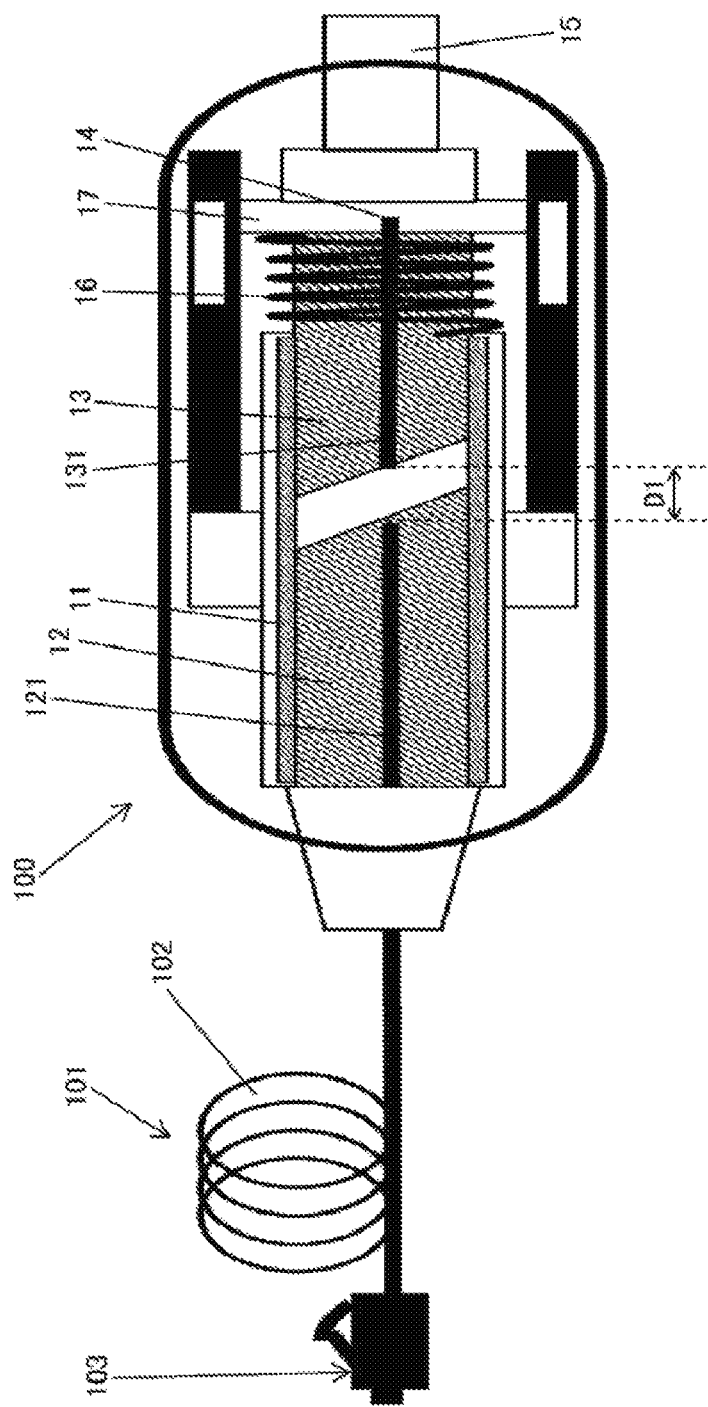
FIG. 1 shows a sectional schematic view of an optical sensor according to the present invention.
Figure 3:
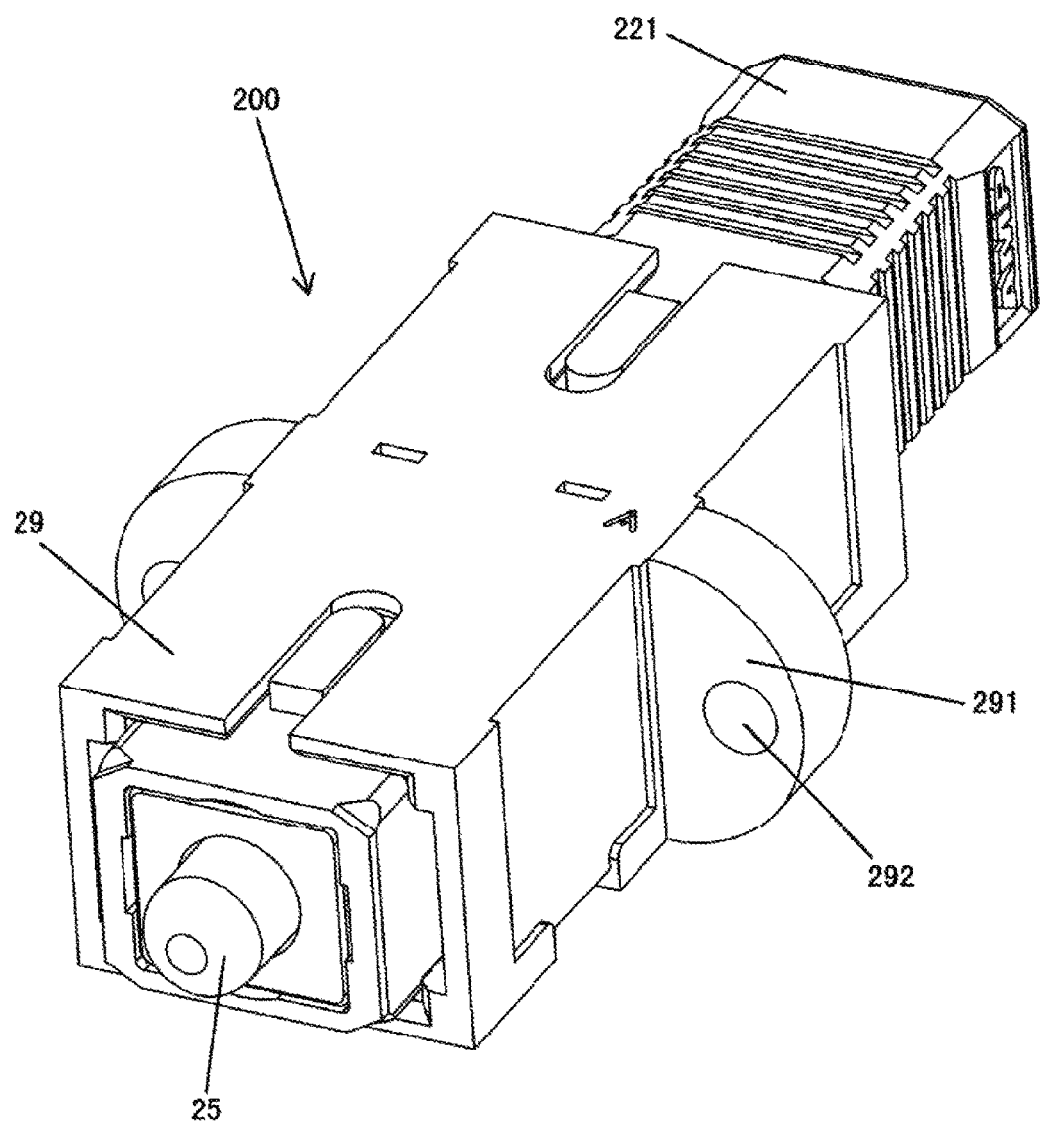
FIG. 3 shows a perspective schematic view of an optical sensor according to a first exemplary embodiment of the present invention.
Figure 4:
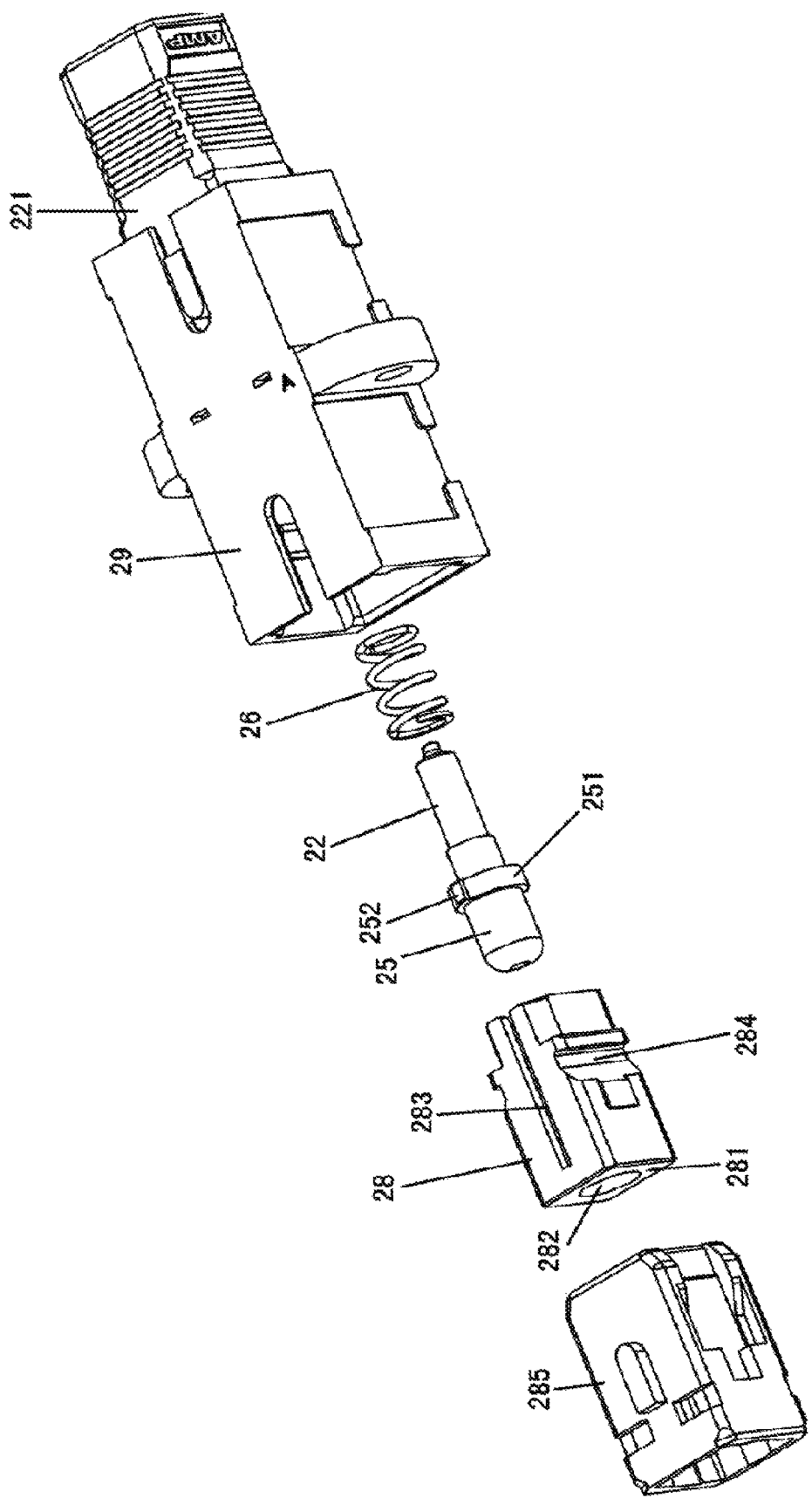
FIG. 4 shows a partially exploded schematic view of the optical sensor shown in FIG. 3.
Figure 5:
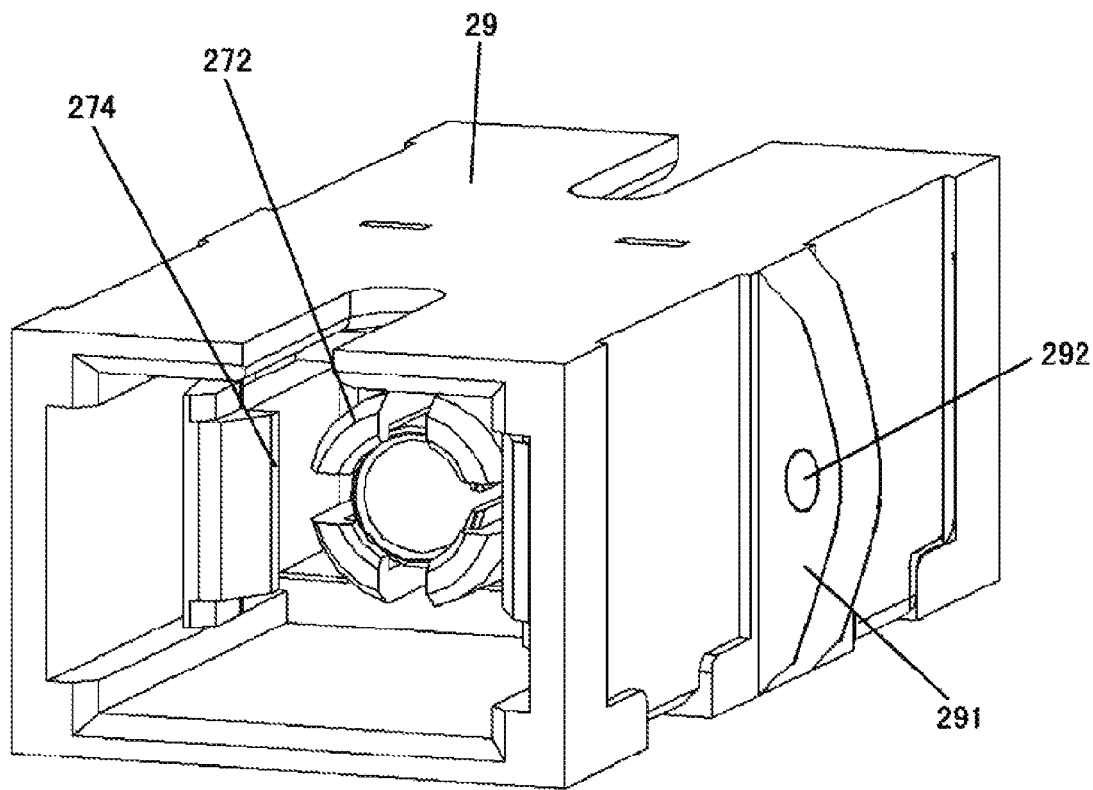
FIG. 5 shows a perspective schematic view of the housing and main body frame of the optical sensor shown in FIG. 4.

FIG. 1 shows a sectional schematic view of an optical sensor 100 according to the present invention. According to the overall inventive concept of the present invention, the optical sensor 100 comprises: a holding sleeve 11; a fixed ferrule 12 for optically coupling with an optical fiber of an optical cable and fixedly mounted in the holding sleeve 11; a movable ferrule 13 movably mounted in the holding sleeve 11, a predetermined distance D1 existing between a first movable end of said movable ferrule 13 and a first fixed end of the fixed ferrule 12 in the holding sleeve 11; a reflection part 14 arranged at a second movable end of said movable ferrule 13 opposite to said first movable end, for reflecting light entering the movable ferrule 13; and an actuation part 15, said actuation part 15 being constructed to drive the movable ferrule 13 to move so that the first movable end of the movable ferrule 13 comes into contact with the first fixed end of the fixed ferrule 12, so as to allow an optical fiber hole 121 of the fixed ferrule 12 to contact with an optical fiber hole 131 of the movable ferrule 13.

The optical sensor 100 further comprises a reset device 16, said reset device 16 being arranged between the movable ferrule 13 and the actuation part 15, and when the actuation part 15 contracts towards the interior of the optical sensor 100 due to a pressure being applied, the actuation part 15 drives the movable ferrule 13 to move against the force of the reset device 16. The reset device 16 can be a spring surrounding the movable ferrule 13, and can also be a reset device whose movement is based on magnetic force or another device capable of automatically driving the actuation part to reset.

Generally, as shown in FIG. 2A, when the actuation part 15 is in an uncompressed state, due to the action of the reset device 16, a predetermined distance D is kept between the first movable end of the movable ferrule 13 and the first fixed end of the fixed ferrule 12 in the holding sleeve 11, so that a beam of light from the fixed ferrule 12 will freely diverge at the first fixed end while only a very small part of the beam can be incident to the movable ferrule and reflected back to the fixed ferrule by the reflection part 14.

On the other hand, as shown in FIG. 2B, when the actuation part 15 is compressed, the actuation part 15 overcomes the acting force of the reset device 16 and drives the movable ferrule 13 to move towards the fixed ferrule 12, so that the first movable end of the movable ferrule 13 comes into contact with the first fixed end of the fixed ferrule 12, so as to allow the optical fiber hole 121 of the fixed ferrule 12 to contact with the optical fiber hole 131 of the movable ferrule 13. Thus, most of the beam from the fixed ferrule 12 will be incident to the movable ferrule and reflected back to the fixed ferrule 12 by the reflection part 14. The reflected beam can be transmitted to an optical time domain reflectometer through an optical cable transmission device, so as to detect the condition where the actuation part 15 is driven (which will be described in detail hereafter).

According to the optical sensor 100 of the present invention, the reflection part 14 can be a flat reflection face formed on the second movable end of the movable ferrule 13, such as by grinding, polishing treatment, film coating, attaching a reflector mirror and the like, for reflecting the beam incident to the movable ferrule 13 and emitting a reflected beam from the movable ferrule 13. In one embodiment, the reflection face can provide a reflection characteristic independent of wavelength. In another embodiment, the reflection face can also provide a selective waveband reflection characteristic dependent on wavelength. In an alternative embodiment, the reflection part 14 is a smooth and flat reflection face formed on the actuation part 15 and in sealed connection with the second movable end of the movable ferrule 13, and thus can also reflect a beam incident to the movable ferrule 13 and emit a reflected beam from the movable ferrule 13.

Furthermore, a limiting part 17 is arranged on the movable ferrule 13, the limiting part 17 being constructed to limit the distance of movement of said movable ferrule 13. The limiting part 17 can be used to prevent the movable ferrule 13 from excessively pressing the fixed ferrule 12 when the actuation part 15 contracts, and from separating from the optical sensor 100 when the actuation part 15 extends due to the action of the reset device 16. It can be understood that the limiting part can also be arranged on the actuation part 15.

According to the optical sensor 100 of the present invention, the end surfaces of the first fixed end of the fixed ferrule 12 and of the first movable end of the movable ferrule 13 are constructed to be parallel with each other and form an angle relative to the axis of the holding sleeve 11. Preferably, the end surfaces of the first fixed end and the first movable end are inclined by 5°-10°, more effectively 8°, relative to the axis of the holding sleeve 11. This inclined structure facilitates a tight contact between the end surfaces of the first fixed end and the first movable end, and minimizes light loss when a beam is transmitted between the fixed ferrule 12 and the movable ferrule 13. However, the present invention is not limited to such an inclined end surface, and those skilled in the art can understand that the inclination of the end surfaces of the first fixed end and first movable end relative to the axis of the holding sleeve 11 can be set to be perpendicular, or they have curved surface structures complementary to each other, as long as a beam is maximally transmitted between the fixed ferrule and movable ferrule after they are in contact.

FIGS. 3-8 show an optical sensor 200 according to a first exemplary embodiment of the present invention, the optical sensor 200 of the first embodiment having the same inventive concept and basic structure as the optical sensor 100. Particularly, referring to FIGS. 3-8, the optical sensor 200 comprises: a holding sleeve 21; a fixed ferrule 22 for optically coupling with an optical fiber of an optical cable and fixedly mounted in the holding sleeve 21; a movable ferrule 23 movably mounted in the holding sleeve 21, a predetermined distance D2 existing between a first movable end of said movable ferrule 23 and a first fixed end of the fixed ferrule 22 in the holding sleeve 21; a reflection part 24 arranged at a second movable end of said movable ferrule 23 opposite to said first movable end, for reflecting light entering the movable ferrule 23; and an actuation part 25, said actuation part 25 being constructed to drive the movable ferrule 23 to move so that the first movable end of the movable ferrule 23 comes into contact with the first fixed end of the fixed ferrule 22. The optical sensor 200 further comprises a reset device 26, said reset device 26 being arranged between the holding sleeve 21 and the actuation part 25, and when the actuation part 25 contracts towards the interior of the optical sensor 200 due to a pressure being applied, the actuation part 25 drives the movable ferrule 23 to move against the force of the reset device 26.

The optical sensor 200 of the first embodiment further comprises a main body frame 27 and a guide frame 28. The holding sleeve 21 is fixedly arranged in the main body frame 27, the guide frame 28 is mounted on the main body frame 27, and the actuation part 25 is movably mounted on the guide frame 28. Particularly, the actuation part 25 passes through a through hole 282 formed on an end part 281 of the guide frame 28, and a protruding limiting part 251 arranged on the actuation part 25 is arranged on the inner side of the end part 281 so as to prevent the actuation part 25 from moving completely out of the guide frame 28, the limiting part 251 is provided with a guide protrusion 252, and said guide frame 28 is provided with a guide groove 283 matching the guide protrusion 252. As such, with the cooperation of the guide protrusion 252 and guide groove 283, the actuation part 25 pushes the movable ferrule 23 to move axially and rotation of the actuation part 25 and the movable ferrule 23 is prevented.

Figure 6:
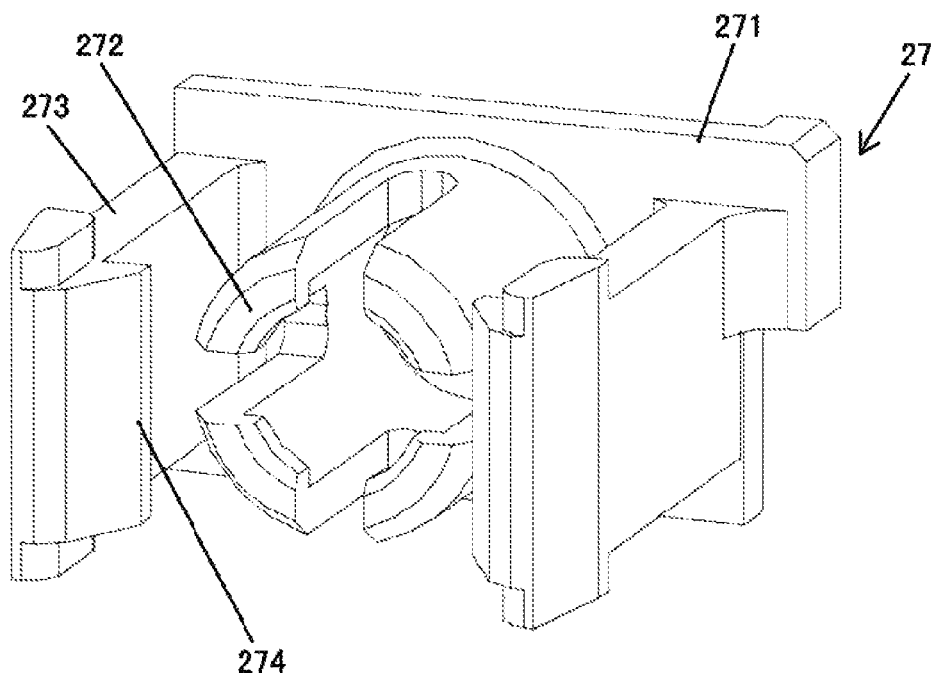
FIG. 6 shows a perspective schematic view of the main body frame mounted in the housing in FIG. 5.
Figure 7:
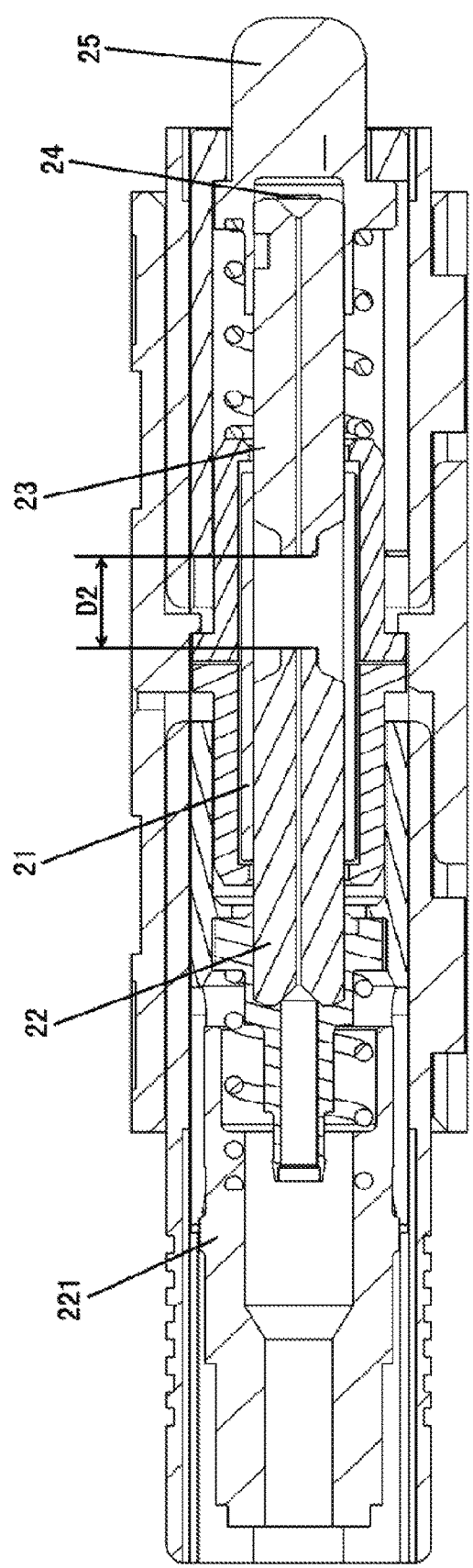
FIG. 7 shows a sectional schematic view vertically sectioned through the optical sensor shown in FIG. 3 along the central axis, with the actuator not compressed.
Figure 8:
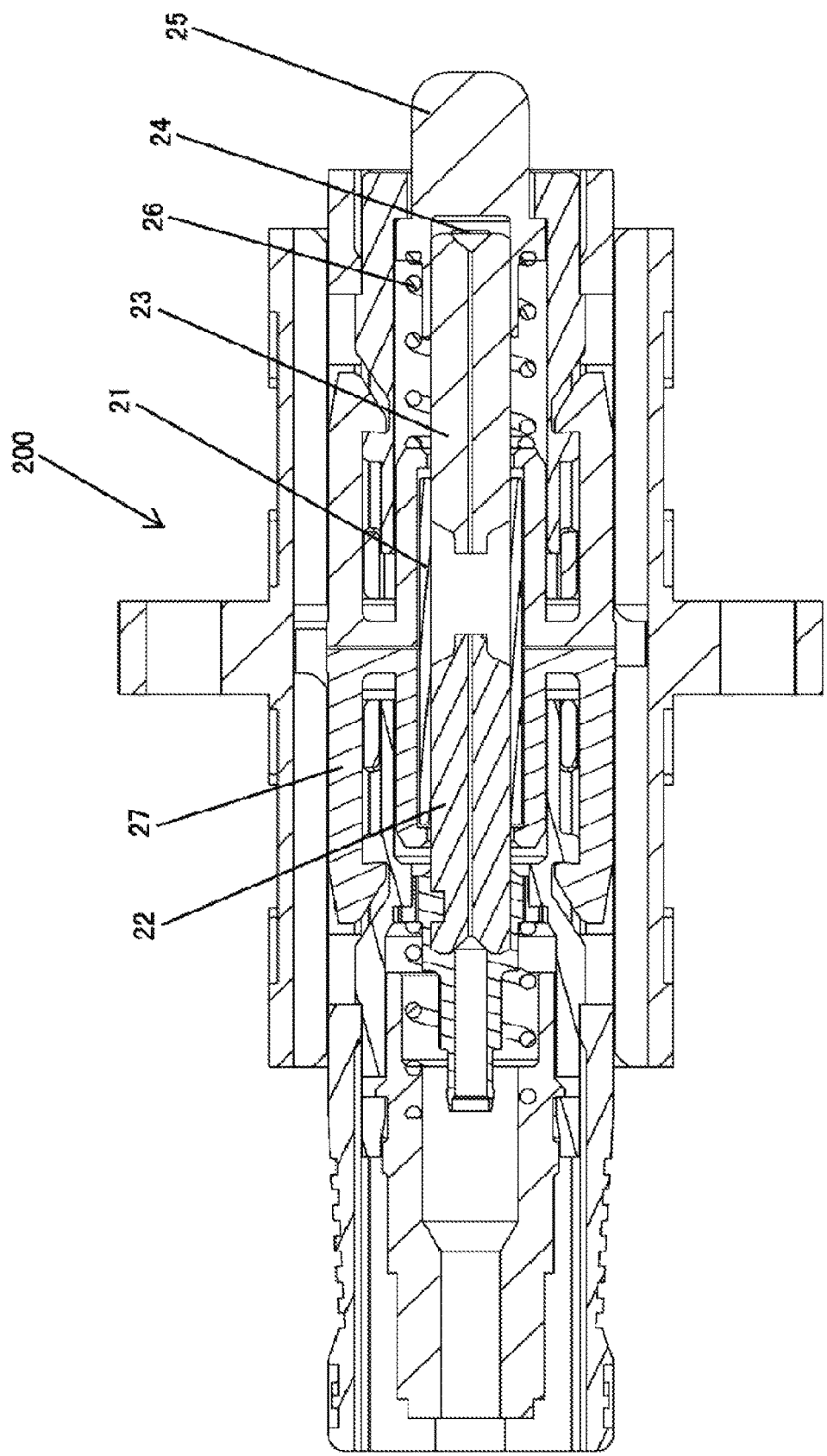
FIG. 8 shows a sectional schematic view horizontally sectioned through the optical sensor shown in FIG. 3 along the central axis, with the actuator not compressed.

The optical sensor 200 further comprises a housing 29, the main body frame 27 being mounted in the housing 29. Referring to FIGS. 6-8, the main body frame 27 comprises: a base part 271 mounted on the housing 29; a sleeve holder 272 extending from the base part 271, the holding sleeve 21 being held in the sleeve holder 272; and two opposite extension arms 273, the sleeve holder 272 being arranged between the two extension arms 273. An engagement protrusion 274 protruding inwards is formed on a free end of the extension arm 273 and, correspondingly, an engagement groove 284 is formed on the guide frame 28. After a spring as the reset device 26 is sheathed on the movable ferrule 23 and the actuation part 25 is allowed to extend out of the interior of the guide frame 28 via the through hole 282, the guide frame 28 can be inserted into the housing 29 and the engagement protrusion 274 is engaged with the engagement groove 284, so as to hold the guide frame 28 in the housing 29. A positioning frame 285 can be further mounted between the housing 29 and the guide frame 28, to stably mount the guide frame 28 inside the housing 29. It can be understood that the positioning frame 285 can also be omitted and some positions on the guide frame 28 are constructed to be in direct contact with the interior of the housing 29, so that the guide frame 28 can also be held inside the housing 29.

Furthermore, a mounting part 291 is arranged on the outside of the housing 29, and a mounting hole 292 is arranged on the mounting part 291. As such, the optical sensor 200 can be mounted onto a monitored object such as an optical cross-connecting box arranged in the field, using a bolt structure.

Figure 9:
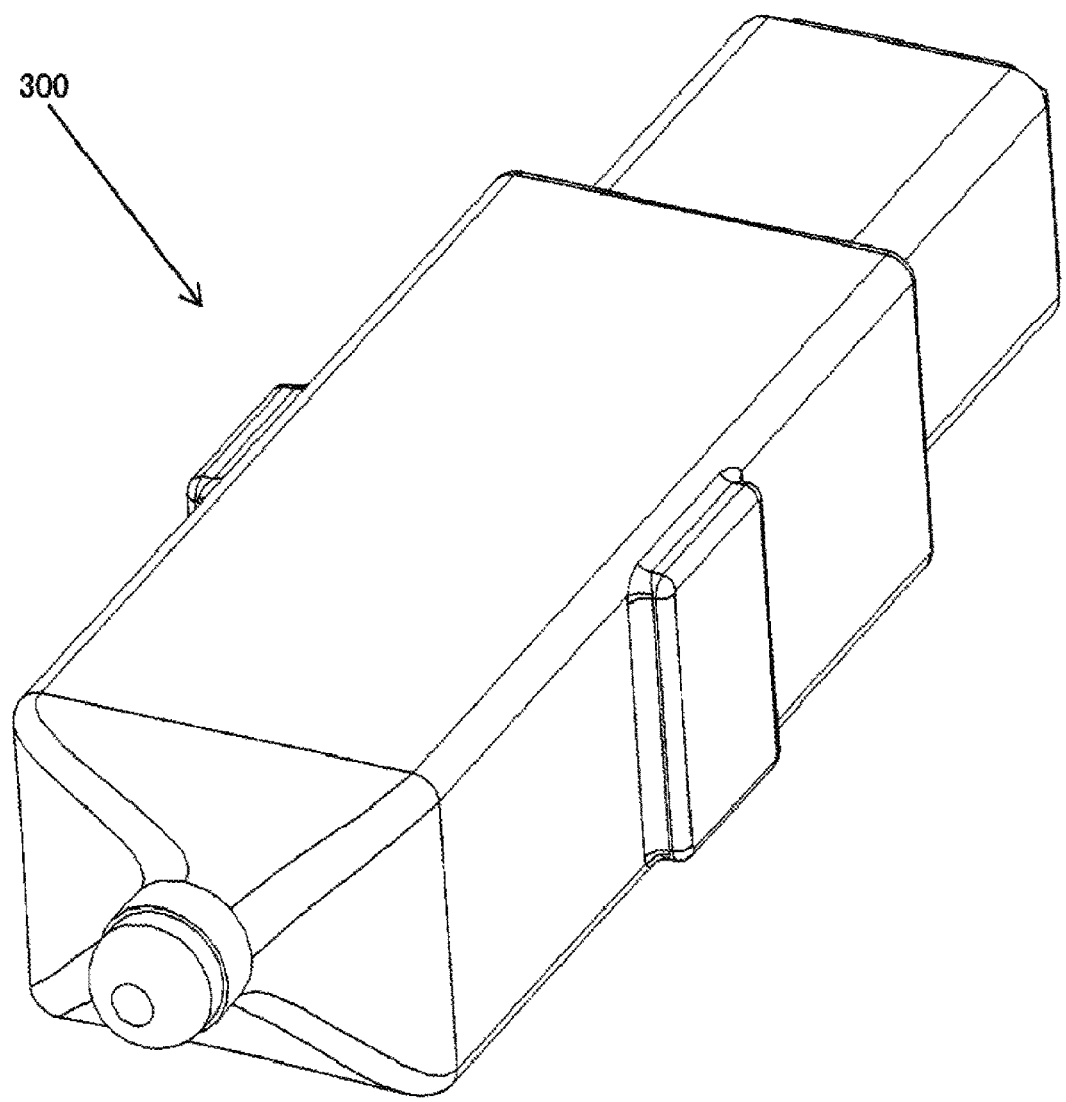
FIG. 9 shows a perspective schematic view of an optical sensor according to a second exemplary embodiment of the present invention.
Figure 10:
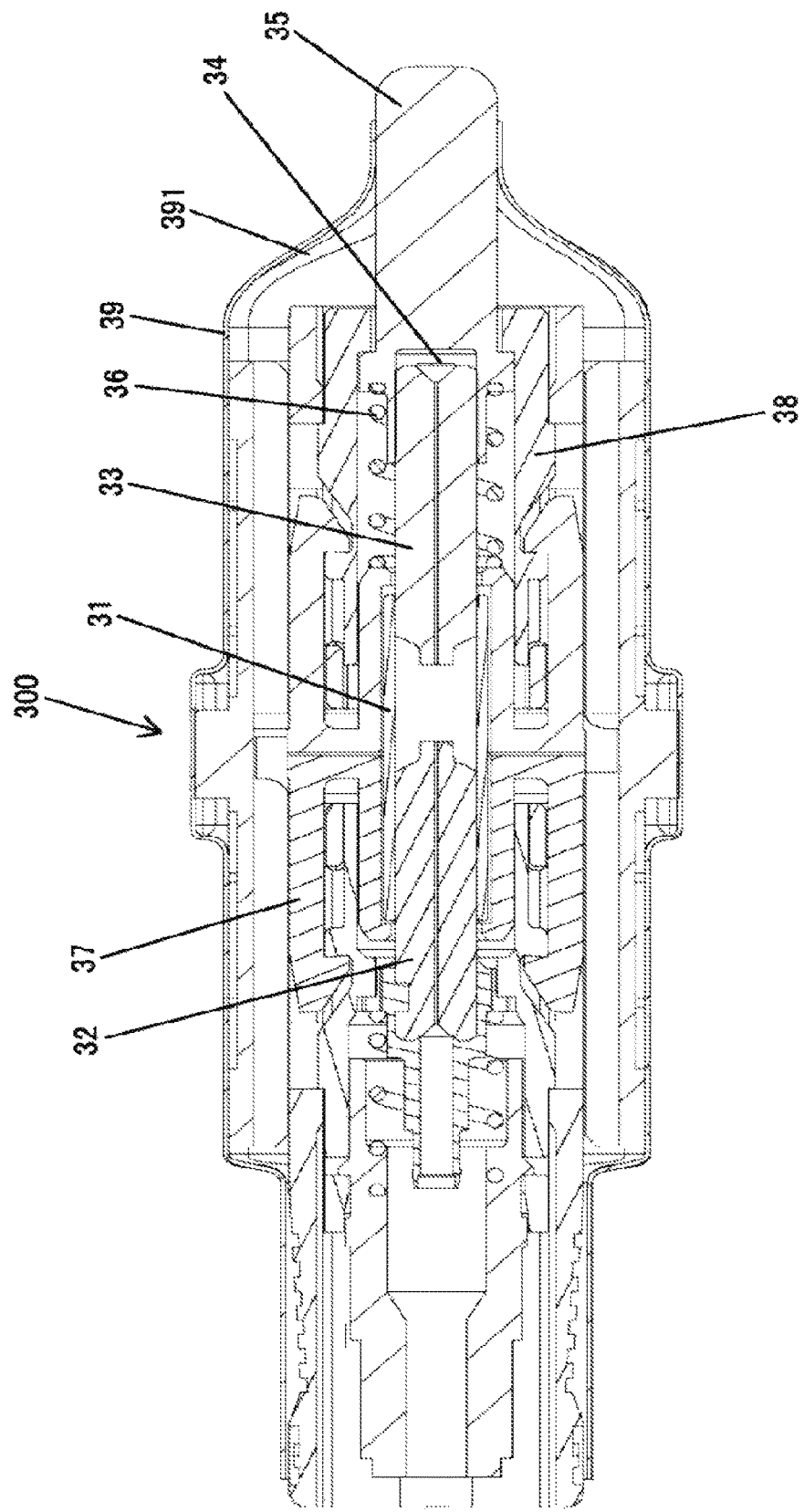
FIG. 10 shows a sectional schematic view horizontally sectioned through the optical sensor shown in FIG. 9 along the central axis, with the actuator not compressed.
Figure 11:
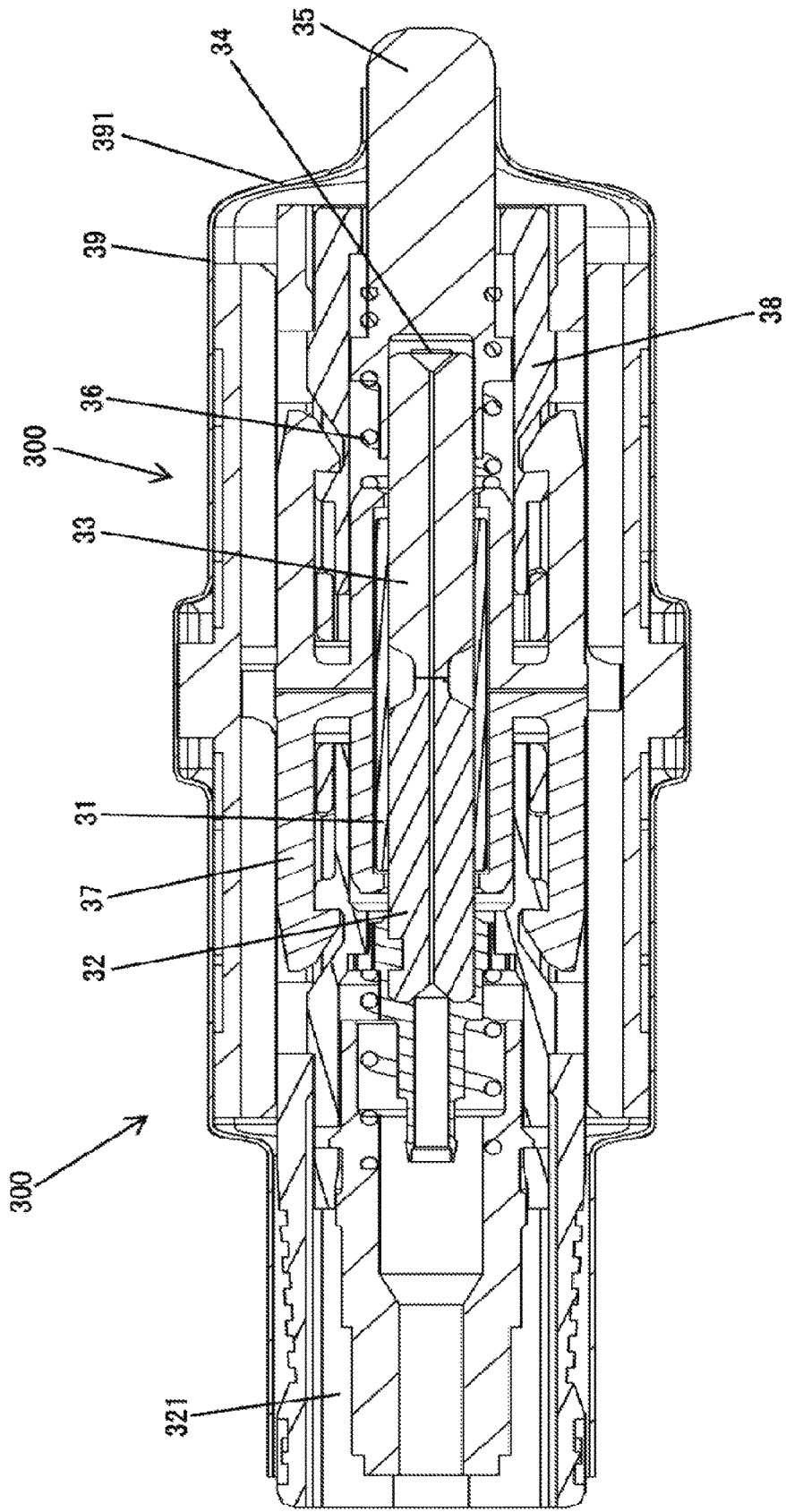
FIG. 11 shows a sectional schematic view horizontally sectioned through the optical sensor shown in FIG. 9 along the central axis, with the actuator compressed.

FIGS. 9-11 show an optical sensor 300 according to a second exemplary embodiment of the present invention, the optical sensor 300 of the second embodiment having the same inventive concept and basic structure as the optical sensor 100. Particularly, referring to FIGS. 9-11, the optical sensor 300 comprises: a holding sleeve 31; a fixed ferrule 32 for optically coupling with an optical fiber of an optical cable and fixedly mounted in the holding sleeve 31; a movable ferrule 33 movably mounted in the holding sleeve 31, a predetermined distance existing between a first movable end of said movable ferrule 33 and a first fixed end of the fixed ferrule 32 in the holding sleeve 31; a reflection part 34 arranged at a second movable end of said movable ferrule 33 opposite to said first movable end, for reflecting light entering the movable ferrule 33; and an actuation part 35, said actuation part 35 being constructed to drive the movable ferrule 33 to move so that the first movable end of the movable ferrule 33 comes into contact with the first fixed end of the fixed ferrule 32. The optical sensor 300 further comprises a reset device 36, said reset device 36 being arranged between the holding sleeve 31 and the actuation part 35, and when the actuation part 35 contracts towards the interior of the optical sensor 300 due to a pressure being applied, the actuation part 35 drives the movable ferrule 33 to move against the force of the reset device 36.

The optical sensor 300 of the second embodiment has a main body frame 37 and a guide frame 38 with the same structure as the main body frame 27 and the guide frame 28 of the optical sensor 200 of the first embodiment, and a detailed description thereof is omitted herein.

In the optical sensor 300 of the third embodiment, the main body frame 37 is mounted in a housing 39 made from a heat shrink material. The housing 39 comprises a flexible connection part 391, and said flexible connection part 391 crosses over the outer side of the guide frame 38 and is connected to the actuation part extending out of the guide frame 38, so that the flexible connection part 391 moves with the actuation part 35. As such, the flexible connection part 391 can effectively seal the interior of the optical sensor 300 to prevent dust, moisture and other impurities from entering the optical sensor 300, so as to protect the optical sensor from the external environment (such as humidity, pollution and other factors). Furthermore, the flexible connection part 391 has elasticity, and when a pressure pressing the actuation part 35 is removed, the actuation part 35 can be restored to an original state by the elastic force of the flexible connection part 391. Therefore, in an alternative embodiment, the flexible connection part 391 can be used as a reset device, and the spring arranged between the holding sleeve 31 and the actuation part 35 can be omitted.

According to an embodiment of a further aspect of the present invention, an optical sensor assembly is provided which comprises: the optical sensors 100, 200 and 300 of the embodiments described above; and an optical cable transmission device 101, constructed to be optically coupled to the second fixed ends of the fixed ferrules 12, 22 and 32, for transmitting light incident to the fixed ferrules 12, 22 and 32 and light reflected from the reflection parts 14, 24 and 34.

Furthermore, the optical cable transmission device 101 comprises an optical cable 102, a first end of the optical cable 102 is provided with a first optical fiber connector 103, and a second end of the optical cable 102 of said optical cable transmission device 101 is directly optically coupled with the second fixed end of the fixed ferrules 12, 22 and 32. Referring to FIGS. 7, 8, 10 and 11, the second fixed ends of the fixed ferrules 22 and 32 are provided with a strain relieve device 221 and an optical fiber fixing assembly, and by means of the strain relieve device 221 and the optical fiber fixing assembly, the optical fiber of the optical cable can be connected to the second fixed ends of the fixed ferrules 22 and 32 in such a way as described for the connection of an optical fiber and a ferrule in an optical fiber connector (such as an SC connector, an LC connector) having an optical fiber ferrule in the prior art.

In an alternative embodiment, the first end of the optical cable of the optical cable transmission device is provided with a first optical fiber connector, and the second end of the optical cable of said optical cable transmission device is optically coupled with the second fixed end of said fixed ferrule through a second optical fiber connector. The second fixed end of the fixed ferrule can be detachably connected with the second optical fiber connector (such as an SC connector or an LC connector) having an optical fiber ferrule in such a way as described for the connection between an optical fiber connector and an adapter in the prior art.

According to an embodiment of a still further aspect of the present invention, a monitoring device is provided which comprises at least one optical sensor assembly as described in the embodiments above and an OTDR (optical time domain reflectometer). The optical sensors of the optical sensor assembly are respectively mounted to at least one monitored object, such as an optical cross-connecting box and distribution box. The optical time domain reflectometer is constructed to emit a main beam towards said optical sensors through the optical cable transmission device of the optical sensor assembly and receive a reflected beam reflected from said optical sensors, and the optical path distances between the optical time domain reflectometer and the optical sensors are different from one another.

Figure 12A:
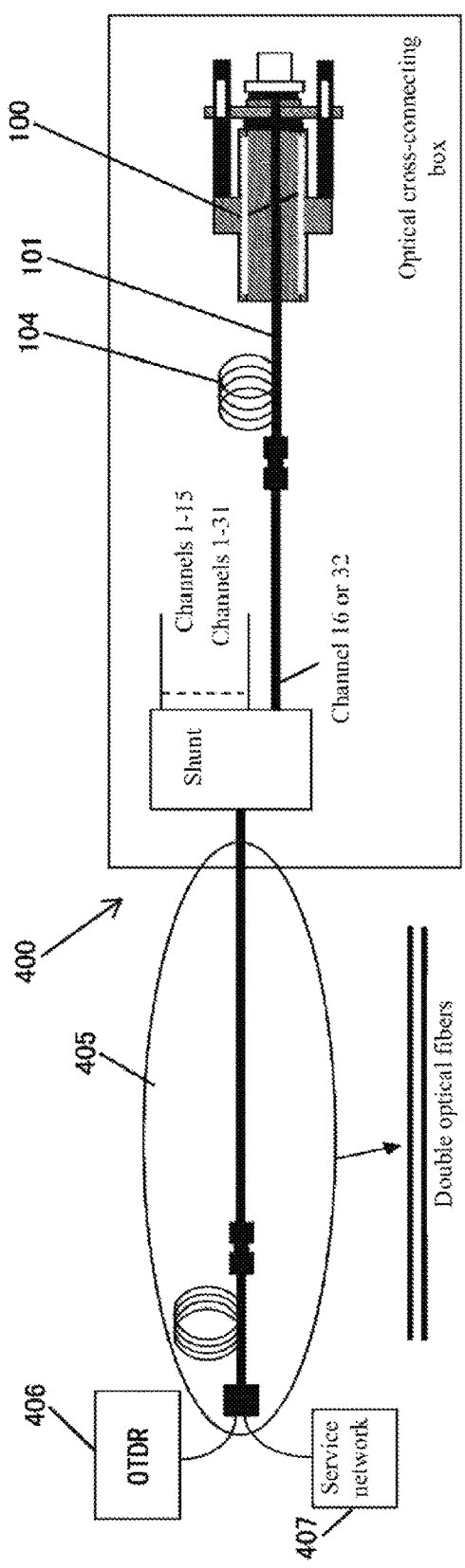
FIG. 12A shows a schematic view of a monitoring device according to a first exemplary embodiment of the present invention.

FIG. 12A shows a schematic view of a monitoring device 400 according to a first exemplary embodiment of the present invention. The monitoring device 400 comprises an optical sensor assembly and an optical time domain reflectometer 406. The optical sensor assembly comprises the optical sensors 100, 200 and 300 according to the present invention and an optical cable transmission device. The optical sensor 100 is mounted to an optical cross-connecting box arranged in a work site (such as an office building, residential building, open country or a hazardous location where people should keep away from), and the optical sensor is configured such that the actuation part 15 of the optical sensor is pressed when a door of the optical cross-connecting box is closed (or opened), so as to result in movement of the movable ferrule towards the fixed ferrule. The optical time domain reflectometer 406 emits a main beam towards the optical sensor 100 through the optical cable transmission device 101 and receives a reflected beam reflected from the optical sensor 100.

The monitoring device 400 of the first embodiment further comprises a shunt 408, which is constructed to split a detection beam out of the main beam from the optical time domain reflectometer 406, the detection beam being transmitted to an optical sensor assembly. More specifically, the optical time domain reflectometer 406 is optically connected with the shunt 408 through a main optical cable transmission device 405. Furthermore, the main optical cable transmission device 405 comprises two optical fibers, of which one optical fiber is connected with the optical time domain reflectometer 406 and the other optical fiber is connected with a service network 407 to transmit communication information to the optical cross-connecting box. Examples of the shunt can include a PLC shunt, a circulator, or an equivalent shunt device. The shunt 408 comprises multiple optical channels, such as 16 or 32 optical channels, wherein one optical channel 16 or optical channel 32 is connected with the optical cable transmission device 101 connected to an optical sensor 100, for transmitting a detection beam and a reflected beam reflected from the optical sensor 100 while the other optical channels 1-15 or 1-31 are used for transmitting other optical information signals.

Figure 12B:
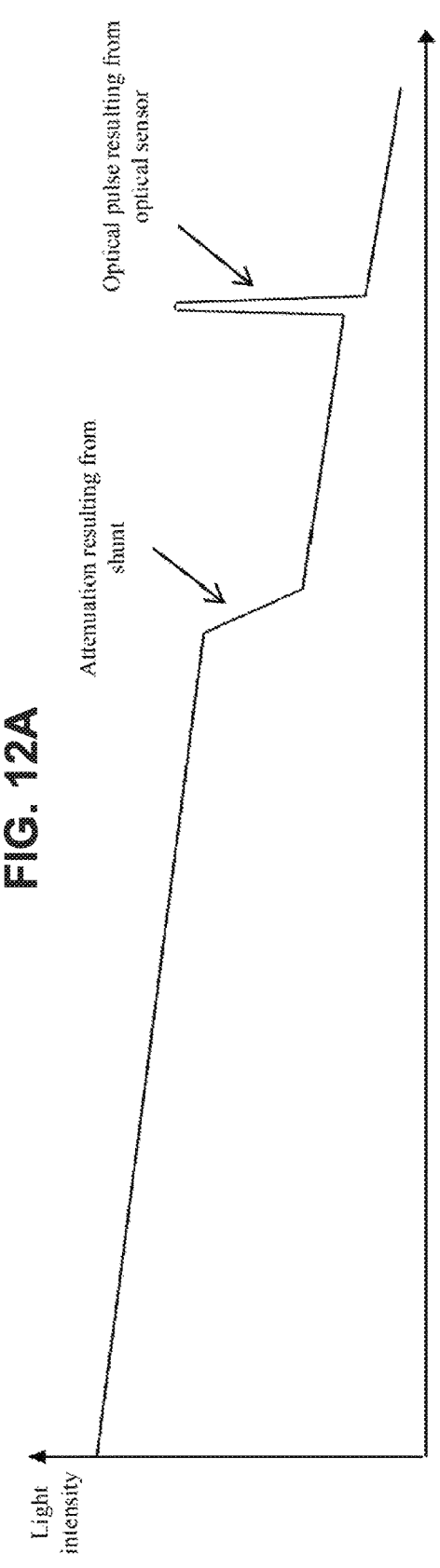
FIG. 12B shows a curve diagram of light intensity acquired at an optical time domain reflectometer as a function of distance when the monitoring device shown in FIG. 12A operates.

The intensity of the reflected beam can be acquired at the optical time domain reflectometer 406. FIG. 12B shows a curve diagram of the light intensity acquired at an optical time domain reflectometer as a function of distance when the monitoring device shown in FIG. 12A operates. As shown in FIG. 12B, in the process of transmitting a beam in the optical fiber and the shunt, the light intensity acquired at the optical time domain reflectometer 406 decreases with the length of the optical fiber (i.e., the distance between the optical sensor and the optical time domain reflectometer) or decreases due to passing through a high attenuation device such as the shunt.

When the door of the optical cross-connecting box is closed, the actuation part 15 of the optical sensor 100 is pressed, resulting in a movement of the movable ferrule 13 so that the first movable end of the movable ferrule 13 comes into contact with the first fixed end of the fixed ferrule 12 and, when the optical fiber hole 121 of the fixed ferrule 12 contacts with the optical fiber hole 131 of the movable ferrule 13, most of the detection beam from the fixed ferrule 12 is incident to the movable ferrule 13 and reflected back to the fixed ferrule 12 by the reflection part 14. The reflected beam is further transmitted to the optical time domain reflectometer 406 and therefore the light intensity acquired by the optical time domain reflectometer 406 shows a pulsed jump; the optical time domain reflectometer 406 further converts the change in light intensity into a change in electric signal, so as to detect the closure of the door of the optical cross-connecting box according to the change in electric signal.

Although an exemplary embodiment, in which an optical pulse can be acquired at the optical time domain reflectometer when the optical cross-connecting box is closed, has been described as above, the present invention is not limited thereto. Those skilled in the art can understand that the optical sensor can be mounted such that the actuation part 15 is driven when the door of the optical cross-connecting box is opened, to drive the movable ferrule 13 to move towards the fixed ferrule, so that the generation of an optical pulse signal is detected at the optical time domain reflectometer 406, so as to determine that the door of the optical cross-connecting box has been opened. In a further alternative embodiment, when the optical sensor is mounted such that when the door is opened, the actuation part 15 drives the movable ferrule 13 to move away from the fixed ferrule due to the acting force of the reset device, a decreased or disappearing optical pulse signal is detected at the optical time domain reflectometer 406, so as to determine that the door of the optical cross-connecting box has been opened. It can be understood that the degree of opening of the door of the optical cross-connecting box can be determined by using the change in intensity of the optical pulse signal detected at the optical time domain reflectometer 406.

Figure 17:
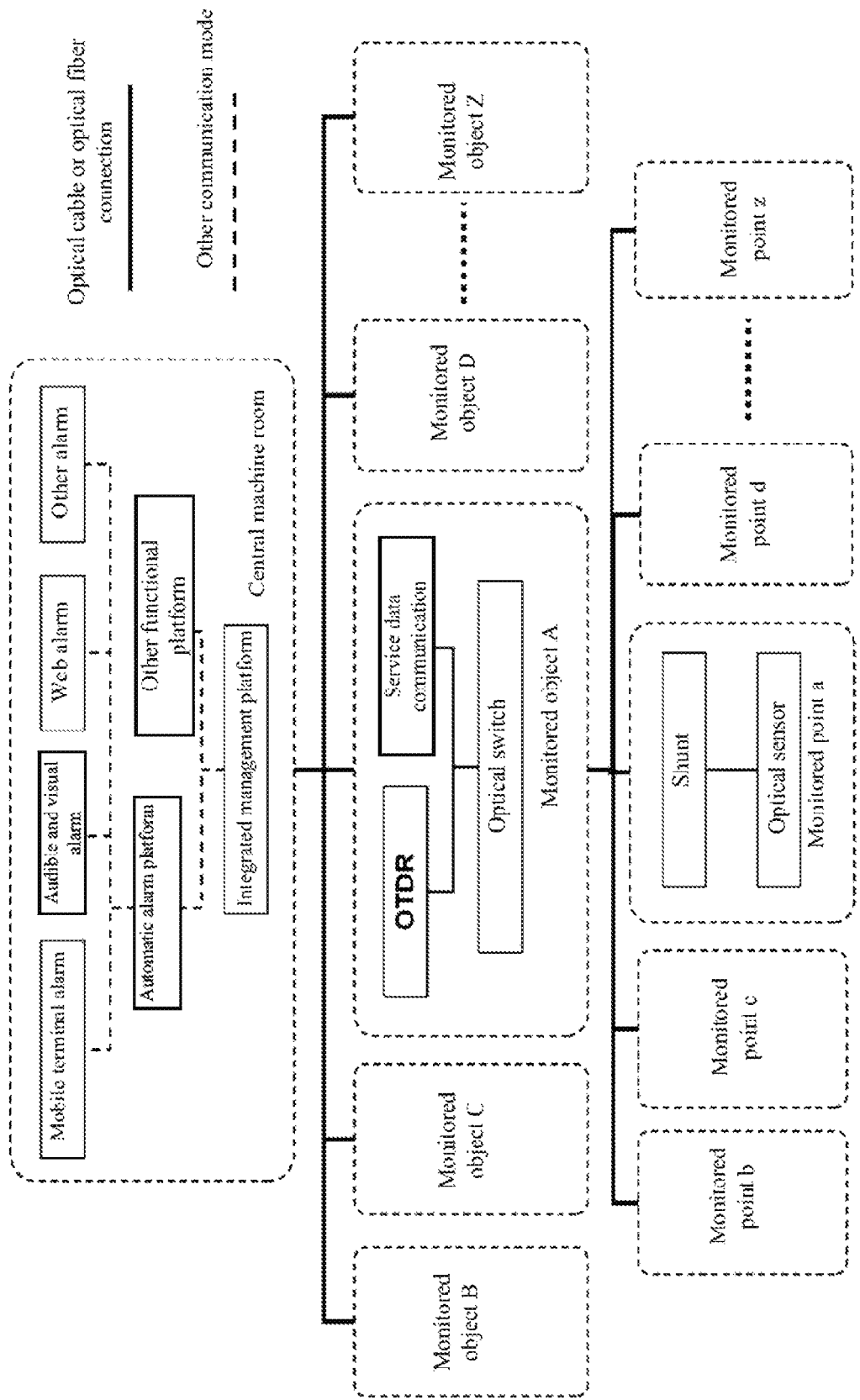
FIG. 17 shows a schematic block diagram of a monitoring system for monitoring multiple monitored points by using the monitoring device according to the present invention.

As shown in FIG. 17, an integrated management platform arranged in a central machine room can monitor in real time the opening or closure of the door of the optical cross-connecting box. If the door of the optical cross-connecting box is opened not for a normal reason, for example opened accidentally, or opened due to technical personnel or engineering personnel forgetting to close it, or opened due to being impacted or stolen, the integrated management platform activates an automatic alarm platform to send an alarm signal, for example, by using a mobile terminal alarm, audible and visual alarm, Web alarm, or other types of alarms which can be sensed by related personnel.

Figure 13A:
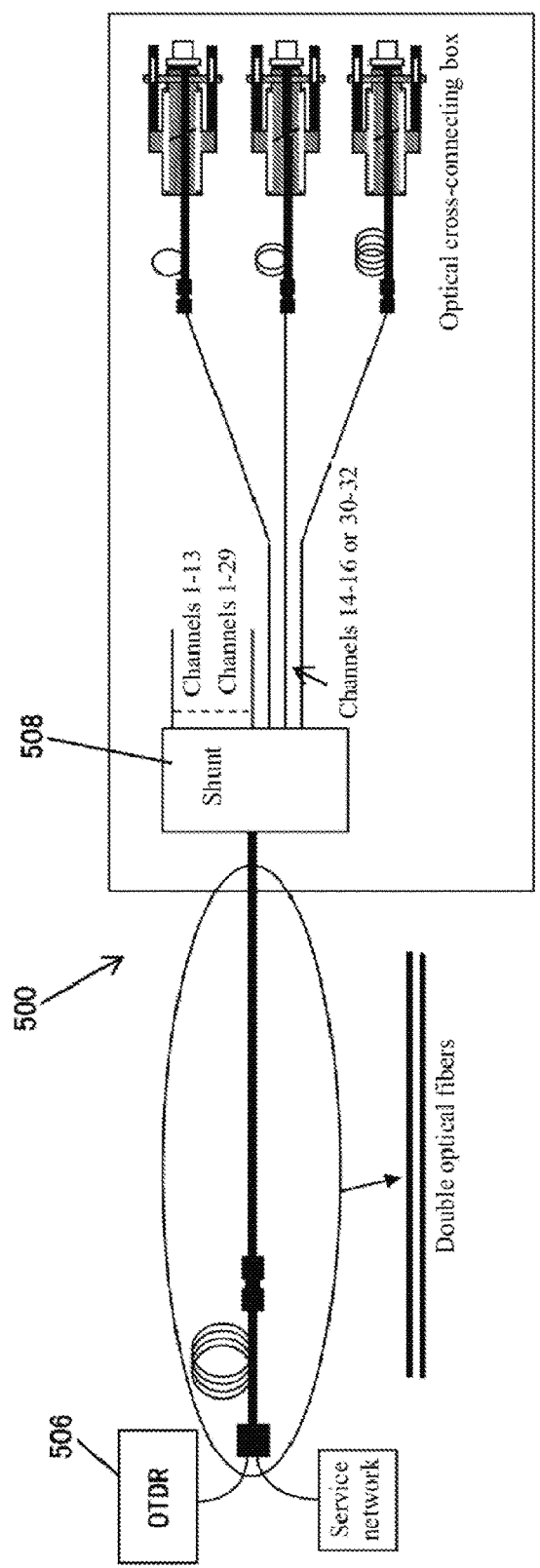
FIG. 13A shows a schematic view of a monitoring device according to a second exemplary embodiment of the present invention.

FIG. 13A shows a schematic view of a monitoring device 500 according to a second exemplary embodiment of the present invention. The monitoring device 500 of the second embodiment is an improved embodiment over the monitoring device 500 of the first embodiment. The monitoring device 500 of the second embodiment differs from the monitoring device 400 of the first embodiment in that three optical channels 14-16 or 30-32 of a shunt 508 are respectively connected to three optical sensor assemblies. The shunt 508 separates three detection beams out of a main beam from an optical time domain reflectometer 506, each detection beam being transmitted to a corresponding optical sensor assembly. As such, multiple optical cross-connecting boxes (such as 3 optical cross-connecting boxes) or multiple positions on one optical cross-connecting box can be monitored using the monitoring device 500 of the second embodiment.

Figure 13B:
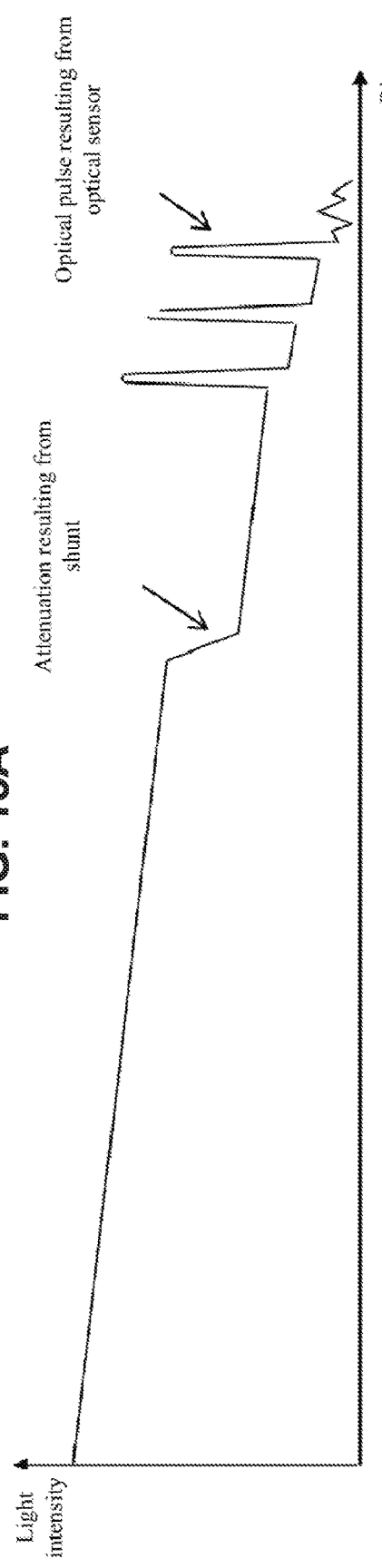
FIG. 13B shows a curve diagram of light intensity acquired at an optical time domain reflectometer as a function of distance when the monitoring device shown in FIG. 13A operates.

FIG. 13B shows a curve diagram of light intensity acquired at an optical time domain reflectometer as a function of distance when the monitoring device shown in FIG. 13A operates. As shown in FIG. 13B, the light intensity acquired by the optical time domain reflectometer 406 shows multiple pulsed jumps, each pulse corresponding to one optical sensor. The optical time domain reflectometer 406 further converts the change in light intensity into a change in electric signal, so as to detect the opening of the door of the corresponding optical cross-connecting box according to the change in electric signal.

Figure 14A:
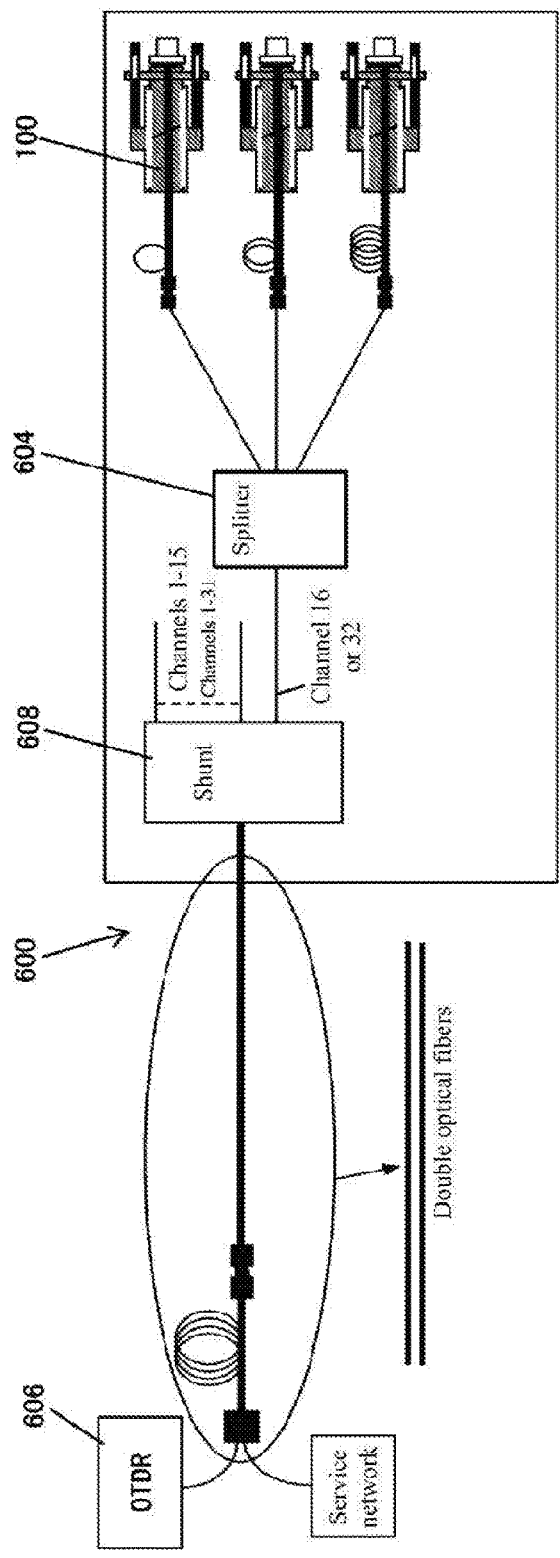
FIG. 14A shows a schematic view of a monitoring device according to a third exemplary embodiment of the present invention.

FIG. 14A shows a schematic view of a monitoring device 600 according to a third exemplary embodiment of the present invention. The monitoring device 600 is an improved embodiment over the monitoring device 400 of the first embodiment. The monitoring device 600 of the third embodiment differs from the monitoring device 400 of the first embodiment in that a splitter 604 is arranged behind the shunt 608. Examples of the splitter include a 1×4 splitter (i.e., splitting a light input signal into 4 branches to output), and a 1×8 splitter. The splitter 604 is in optical communication with the optical channel 16 or 32 of the shunt 608, for splitting a detection beam from the optical channel 16 or 32 into 4 detection sub-beams, each detection sub-beam being transmitted to the corresponding optical sensor assembly. Thus, multiple optical cross-connecting boxes (such as 3 optical cross-connecting boxes) or multiple positions on one optical cross-connecting box can be monitored using the monitoring device 600 of the third embodiment.

Figure 14B:
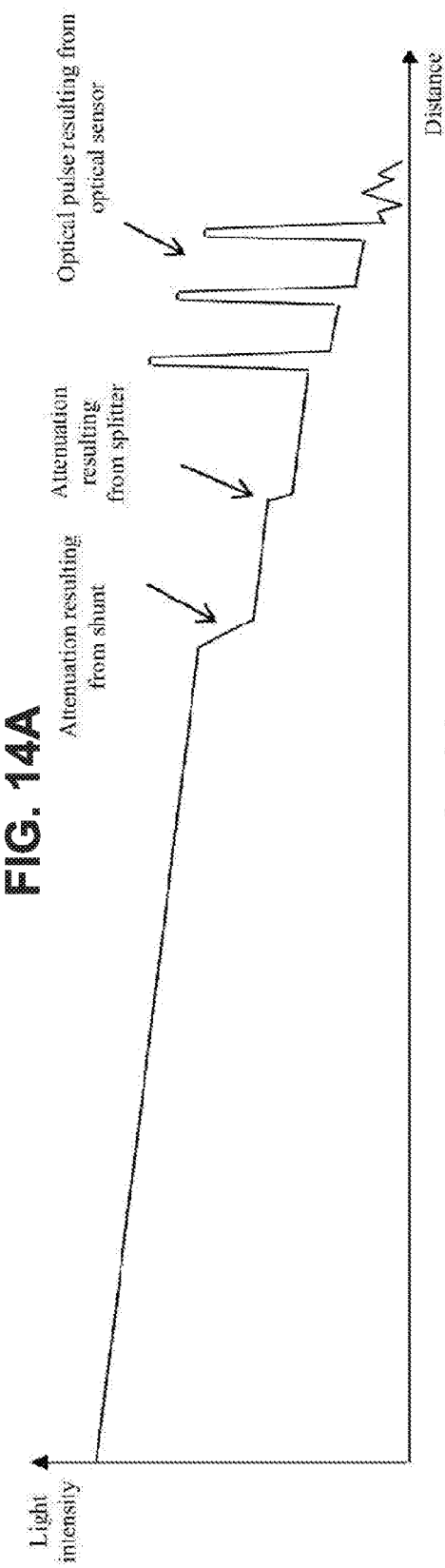
FIG. 14B shows a curve diagram of light intensity acquired at an optical time domain reflectometer as a function of distance when the monitoring device shown in FIG. 14A operates.

FIG. 14B shows a curve diagram of light intensity acquired at an optical time domain reflectometer as a function of distance when the monitoring device shown in FIG. 14A operates. As shown in FIG. 14B, the light intensity acquired by an optical time domain reflectometer 606 shows multiple pulsed jumps, each pulse corresponding to one optical sensor. The optical time domain reflectometer 606 further converts the change in light intensity into a change in electric signal, so as to detect the opening of the door of the corresponding optical cross-connecting box according to the change in electric signal.

FIG. 15A shows a schematic view of a monitoring device 700 according to a fourth exemplary embodiment of the present invention. The monitoring device 700 is an improved embodiment over the monitoring device 600 of the third embodiment. The monitoring device 700 of the fourth embodiment differs from the monitoring device 600 of the third embodiment in that there are multiple groups of monitored objects and one optical switch 703 is provided, for example each group of monitored objects is arranged in one region. Examples of the optical switch can include a wavelength division multiplexer or equivalent multiplexing device. In the monitoring device 700, one shunt 708 and at least one optical sensor assembly are arranged for each group of monitored objects and, correspondingly, an optical fiber for transmitting a detection beam in a main optical cable transmission device 705 is divided into multiple optical sub-fibers, each optical sub-fiber being optically connected with one corresponding shunt 704. The optical switch 703 is constructed to control one of the multiple shunts to come into an operating state, that is, during one time period, only one shunt 704 is in the operating state and the optical sensor corresponding to the shunt in the operating state has a detection beam, while the other shunts are in an idle state and no detection beam is present in the optical sensors corresponding to the idle shunts. Therefore, the curve diagram shown in FIG. 15B of light intensity acquired at an optical time domain reflectometer as a function of distance when the monitoring device 700 of the fourth embodiment operates is substantially the same as the curve diagram shown in FIG. 14B of light intensity acquired at an optical time domain reflectometer as a function of distance when the monitoring device 600 of the third embodiment operates.

Figure 16A:
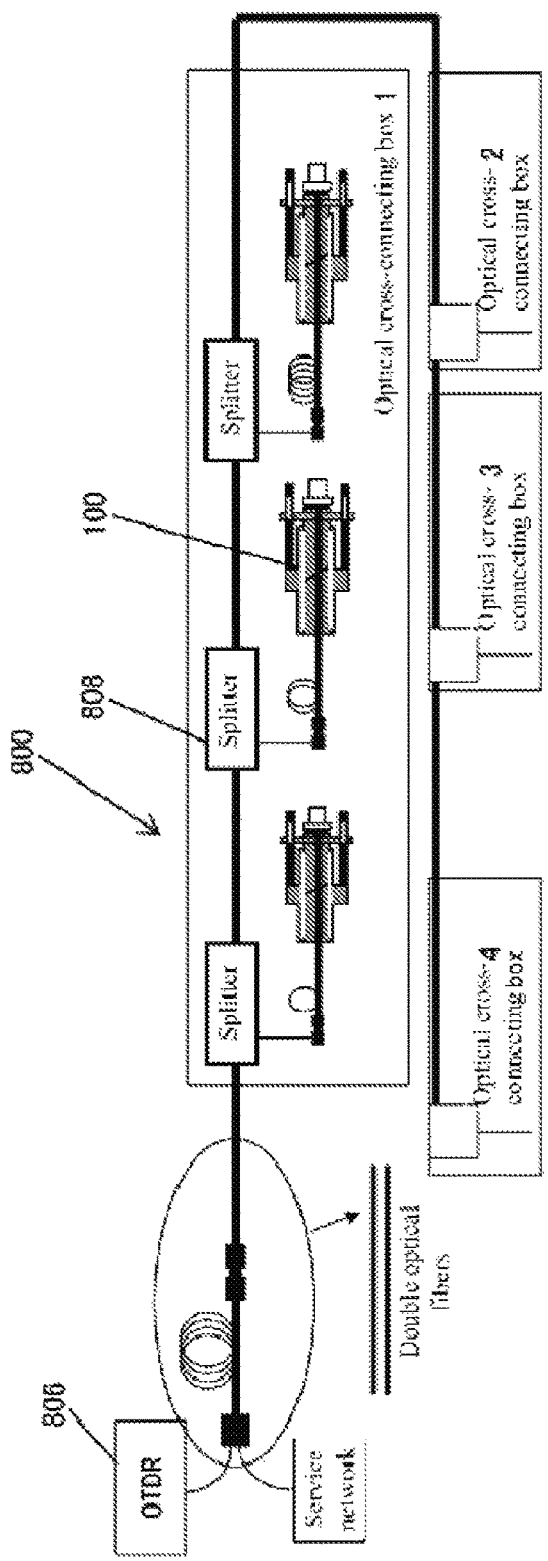
FIG. 16A shows a schematic view of a monitoring device according to a fifth exemplary embodiment of the present invention.

FIG. 16A shows a schematic view of a monitoring device 800 according to a fifth exemplary embodiment of the present invention. The monitoring device 800 of the fifth embodiment comprises at least multiple optical sensor assemblies as described in the embodiments above and an optical time domain reflectometer. The optical sensors of the optical sensor assemblies are respectively mounted to at least one monitored object, such as an optical cross-connecting box and distribution box. The monitored objects are divided into multiple groups; for example, each group of monitored objects is arranged in one region, and at least one optical sensor assembly is arranged for each group of monitored objects.

The monitoring device 800 of the fifth embodiment further comprises multiple splitters 808 connected in series, each splitter 808 splits a detection beam from a previous stage into a main detection beam and a detection sub-beam, and each splitter 808 is arranged in a propagation path of the detection main beam and each optical sensor 101 receives the corresponding detection sub-beam.

Furthermore, the light flux ratio of the main detection beam and detection sub-beam output from each splitter 808 is 20:80-1:99.

Figure 16B:
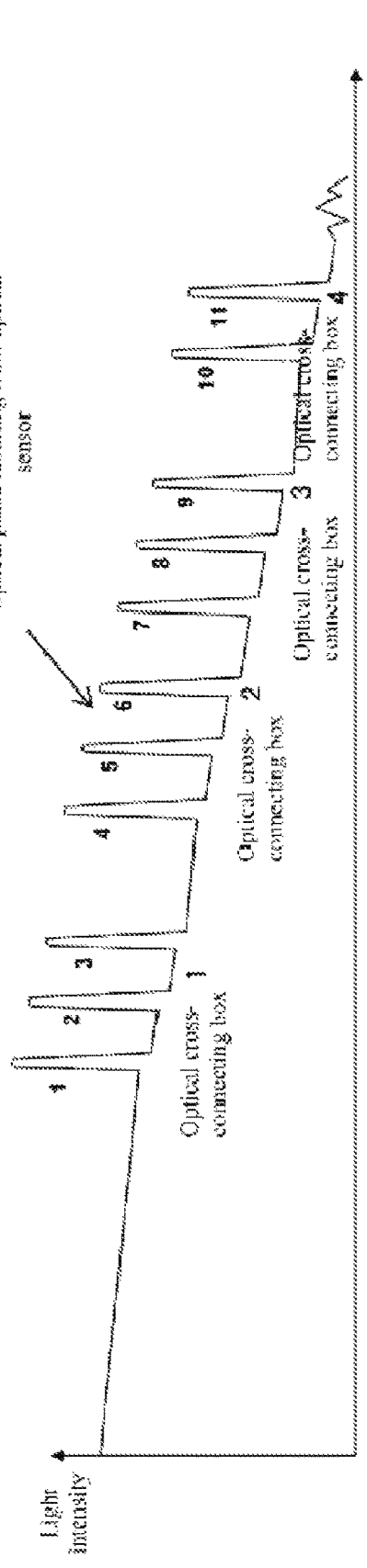
FIG. 16B shows a curve diagram of light intensity acquired at an optical time domain reflectometer as a function of distance when the monitoring device shown in FIG. 16A operates.

FIG. 16B shows a curve diagram of light intensity acquired at an optical time domain reflectometer as a function of distance when the monitoring device 800 shown in FIG. 16A operates. As shown in FIG. 16B, the light intensity acquired by the optical time domain reflectometer 806 shows multiple pulsed jumps, each pulse corresponding to one optical sensor. The optical time domain reflectometer 806 further converts the change in light intensity into a change in electric signal, so as to detect the opening of the door of the corresponding optical cross-connecting box according to the change in electric signal.

FIG. 17 shows a schematic block diagram of a monitoring system for monitoring multiple monitored points using the monitoring device of the present invention. As shown in FIG. 17, the mechanical state of one monitored object (such as monitored objects A-Z), multiple monitored points of one monitored object (such as monitored points A-Z of monitored object A), or multiple groups of monitored objects can be monitored using the monitoring device of the present invention based on optical sensors.

An on-site optical cross-connecting box can be taken as a monitored object when using the monitoring devices of the embodiments of the present invention. However, the present invention is not limited to this and it can be understood that any equipment which can drive the actuation part of the present invention to move can be used as a monitored object for the monitoring device of the present invention, such as a distribution box, an outdoor transformer box body, a flood wall gate, a manhole cover, and various objects with open/close operation, such as tanks arranged in hazardous locations where people should keep away from.

Figure 18:
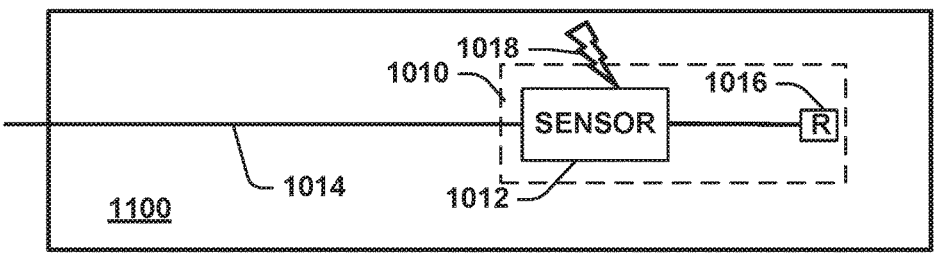
FIG. 18 is a block diagram illustrating aspects of an example of a sensor system in accordance with the present disclosure.

Referring now additionally to FIGS. 18-30, this disclosure relates to remote monitoring of passive optical network elements, based on the reflected power at certain discrete points along an optical fiber. FIG. 18 illustrates an example of a sensor system in accordance with aspects of the present disclosure. The illustrated sensor system 1010 includes a sensor 1012 coupled to an optical fiber 1014 and a reflector 1016. The reflector 1016 is configured to provide a reflected optical signal. Power can be reflected by metal coated fibers, Thin Film Filters (TFF) or Bragg grating devices, for example.

In certain embodiments of the illustrated sensor system 1010, the sensor 1012 is situated in an enclosure 1100 such as an equipment cabinet. The reflected power is intensity modulated in response to a parameter 1018 associated with the enclosure 1100, such as moisture in the enclosure, enclosure temperature, intrusion into the enclosure, etc. These modulated reflections can be detected with a conventional optical time-domain reflectometer (OTDR). An OTDR is an optoelectronic instrument used to characterize an optical fiber. Optical pulses are injected into an end of the optical fiber 1014, and light reflected back from points along the fiber 1014 is extracted from the same end of the fiber 1014 and analyzed. The strength of the return pulses is measured as a function of time, and is plotted as a function of fiber length. Embodiments of the disclosed sensor system thus provide a fully passive optical sensor system (no electricity or battery required at the monitored enclosure).

Figure 19:
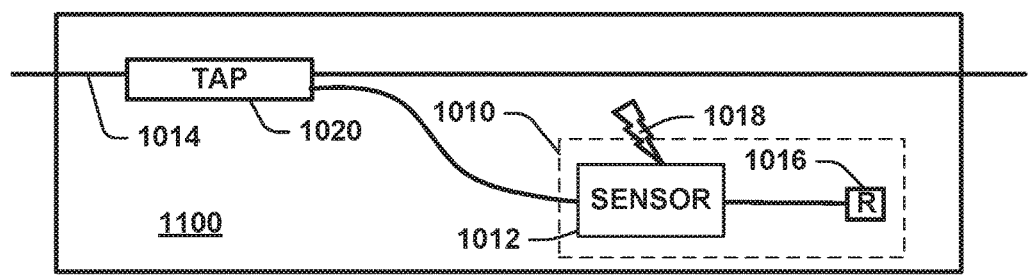
FIG. 19 is a block diagram illustrating aspects of another example of a sensor system in accordance with the present disclosure.

In the example of FIG. 18, a dedicated optical fiber 1014 is provided for monitoring parameters of the enclosure 1100. FIG. 19 illustrates an example that includes a fiber optic tap 1020 that provides a connection to the sensor 1012. In some implementations, a multiplexing scheme, such as wavelength division multiplexing (WDM), is used to allow the same fiber 1014 to be used both for monitoring and for communications.

Figure 20:
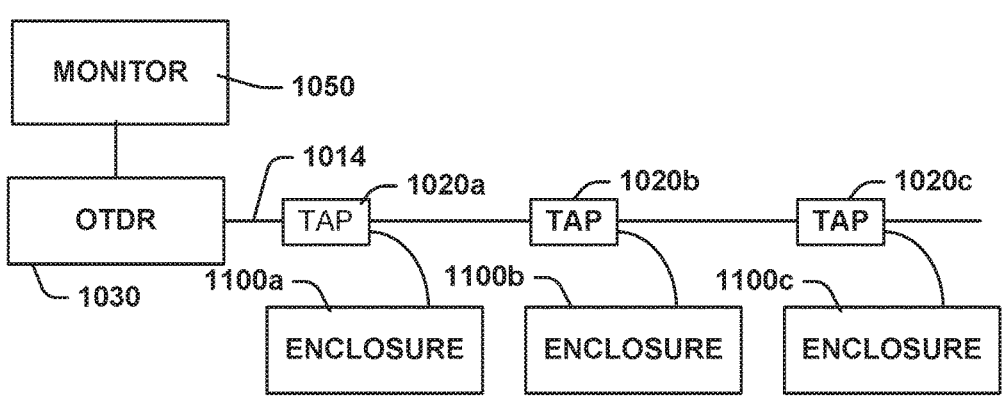
FIG. 20 is a block diagram illustrating aspects of an example of an enclosure monitoring system in accordance with the present disclosure.
Figure 21:
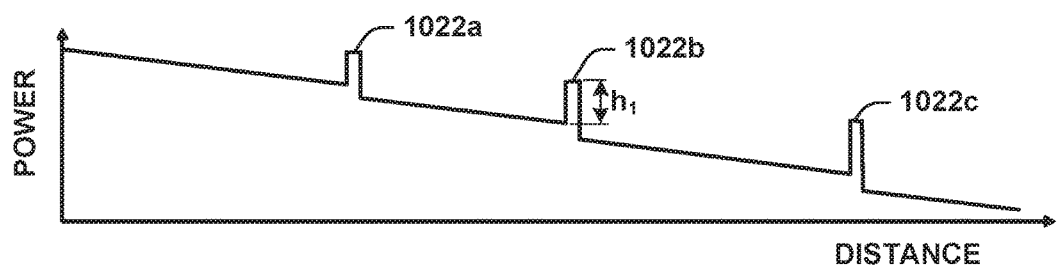
FIG. 21 is a chart illustrating example optical time-domain reflectometer signals of a monitoring system such as that shown in FIG. 20.

FIG. 20 illustrates an implementation where three tap couplers 1020 are coupled to the fiber 1014 to connect to three sensors in respective enclosures 1100a, 1100b, 1100c. The optical fiber 1014 is coupled to an OTDR 1030 that receives light reflected from the reflectors 1016 associated with the sensors 1012 for each of the enclosures 1100a, 1100b, 1100c. FIG. 21 illustrates an example of the return pulses plotted as a function of distance, thus providing a pulse 1022a, 1022b, 1022c corresponding to each of the enclosures 1100a, 1100b, 1100c.

The OTDR may further be connected to a monitoring system 1050 that provides information regarding the monitored enclosures, alarms, data logging, etc. The monitoring system 1050 could be implemented by any suitable computing system. In some examples, the monitoring system 1050 includes an appropriately programmed processor configured to execute various processes for analyzing the OTDR signals. A system memory stores an operating system for controlling the operation of the monitoring system.

The system memory is computer-readable media. Examples of computer-readable media include computer storage media and communication media. Computer storage media is physical media that is distinguished from communication media. Computer storage media includes physical volatile and nonvolatile, removable and non-removable media implemented in any method or technology for persistent storage of information, such as computer-readable instructions, data structures, program modules, or other data. Computer storage media also includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to persistently store desired information and which can be accessed by the monitoring system 1050. Any such computer storage media may be part of or external to the monitoring system 1050.

Communication media is typically embodied by computer-readable instructions, data structures, program modules, or other data, in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

The monitoring system 1050 may further include one or more input and output devices, such as a keyboard, mouse, a display, etc. The monitoring system 1050 can be connected to the OTDR 1030 and other computing devices via a network that provides a data communication path for data transfer between the OTDR 1030 and the monitoring system 1050.

Figure 22A:
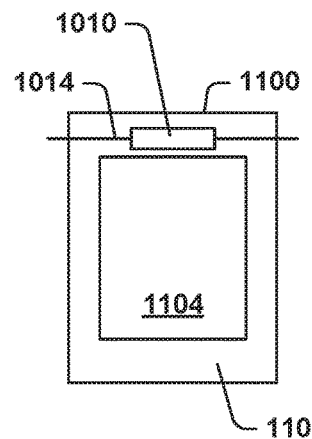
FIGS. 22A-22C are block diagrams illustrating examples of enclosure and sensor system configurations in accordance with the present disclosure.
Figure 22B:
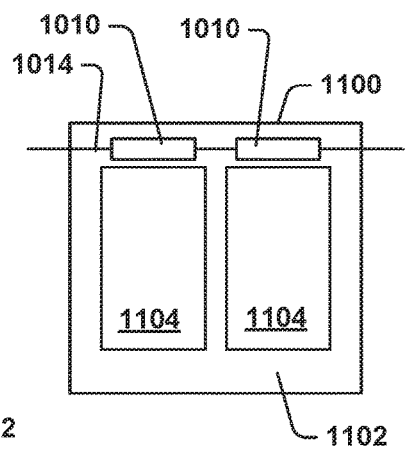
Figure 22C:
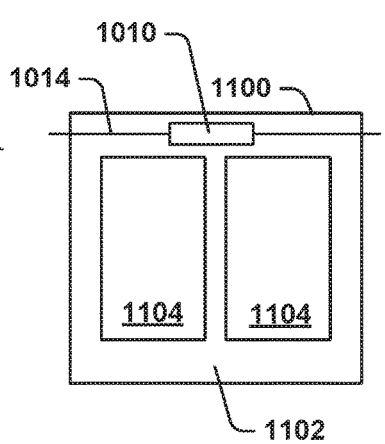

FIGS. 22A, 22B and 22C illustrate examples of various configurations for monitoring enclosures, such as telecommunications equipment cabinets. Each enclosure 1100 includes an enclosure housing 1102 and one or more doors 1104 that are movable relative to the housing 1102 to give access to the inside of the enclosure 1100. Each enclosure 1100 has a sensor system 1010 associated therewith that is connected to an optical fiber 1014. In FIG. 22A, the enclosure 1100 includes a single door 1104, and a corresponding sensor system 1010 that monitors intrusion, for example, by attenuating the signal reflected by the reflector 1016 in response to the door 1104 opening. FIG. 22B illustrates an alternative arrangement where two doors 1104 are provided with corresponding intrusion sensors 1010. FIG. 22C illustrates another alternative arrangement that includes two doors 1104, with a single sensor 1010 that is responsive to either of the doors 1104 opening. Of course many other arrangements are possible.

Figure 23:
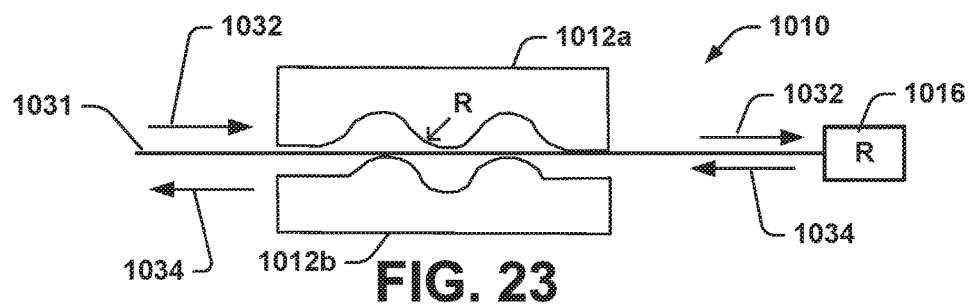
FIG. 23 is a block diagram conceptually illustrating an example of a sensor in accordance with the present disclosure, situated in a first position.
Figure 24:
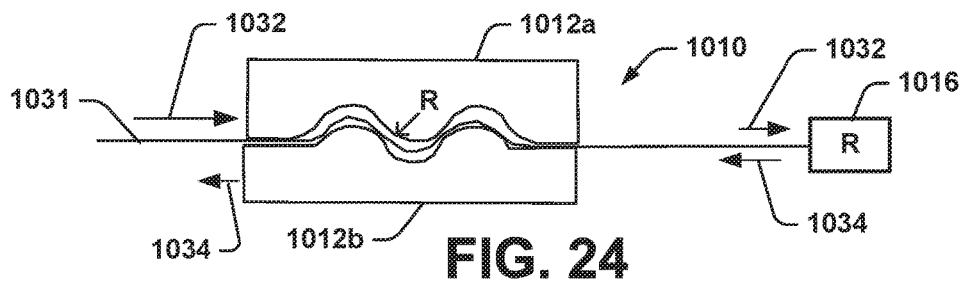
FIG. 24 is a block diagram showing the example sensor of FIG. 23 situated in a second position.

FIGS. 23 and 24 conceptually illustrates an example of the sensor 1010 in first and second positions, respectively, where the second position is configured to attenuate the reflected optical signal more than the first position. The sensor 1010 is configured to move between the first and second positions in response to the monitored parameter 1018.

FIG. 23 illustrates the sensor 1010 in the first, or open position. In the examples disclosed above in conjunction with FIGS. 22A-22C, the sensor 1010 functions as an intrusion monitor that senses the cabinet door 1104 opening. In some implementations, the sensor system 1010 also confirms secure closure of the door 1104. The sensor 1012 includes first and second parts 1012a, 1012b. In intrusion monitoring implementations, the sensor 1012 is situated in the first position (first and second parts 1012a, 1012b spaced apart) by any suitable positioning device, such as a spring. An example of the positioning mechanism is discussed further below. The sensor is based on macrobending, with the first and second parts 1012a, 1012b including an inner surface defining one or more bends or curves, each with a radius R of 3 to 5 mm in some implementations. In the illustrated embodiment, the inner surfaces of the first and second parts 1012a, 1012b each have a plurality of the radiused bends. For example, matched cladding G652 fiber is provided with a straight, cleaved end with a gold plated fiber end or Bragg grating to implement the reflector 1016.

The sensor 1012 is situated in the first position when the door 1104 is closed. In the open position illustrated in FIG. 23, the first and second parts 1012a, 1012b are spaced apart by a first distance such that a light path 1031 is provided between the first and second sensor parts 1012a, 1012b that minimally attenuates both the incoming light 1032 and reflected light 1034.

FIG. 24 illustrates the sensor system 1010 in the second position, where the first and second parts 1012a, 1012b are moved closer to one another such that they are spaced apart by a second distance in response to the monitored parameter 1018. In the illustrated example, the monitored parameter 1018 is enclosure intrusion, so when the cabinet door 1104 is opened, the first and second parts 1012a, 1012b move closer together and deform the fiber 1014, which attenuates the reflected signal more than it is attenuated when in the first position shown in FIG. 23. In some embodiments, the fiber deformation results in attenuation of about 3 to 5 dB at 1625 nm. Accordingly, the power of the reflected light 1034 reaching the OTDR is reduced. Of course other ways and devices for attenuating the reflected signal are possible and would be evident to one of ordinary skill in the art having the benefit of this disclosure. For example, the optical fiber could be bent varying amounts to correspondingly vary attenuation, or the fiber could be looped and the radius of the loop varied. Further, the first position of the sensor could be associated with the door open and the second position with the door closed, wherein the opening of the door will then result in an increased reflection.

For a configuration such as the example illustrated in FIGS. 23 and 24, the minimum recommended dynamic range of the OTDR is 35 dB (at 1625 nm) in order to "see" the reflected pulse. This can be calculated as in the following example:

2× {20 km Length fiber (5 dB)}+Loss of 1×64 splitter (20.5 dB)+loss APC connector (0.5 dB)}+reflection from cleaved fiber (15 dB)=67 dB (Note: the 35 dB dynamic range of the OTDR corresponds with a physical 2×35 dB=70 dB dynamic range.)

Figure 25:
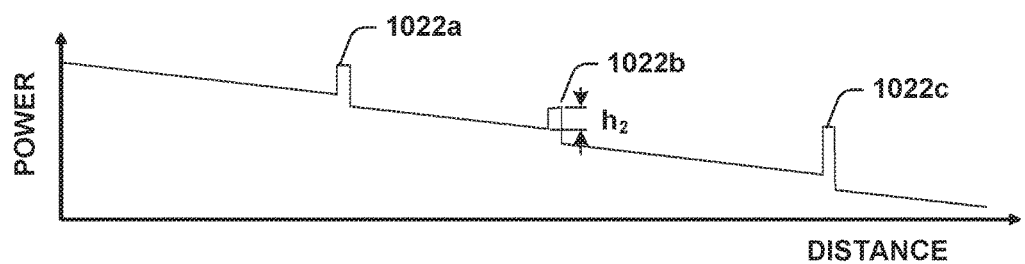
FIG. 25 is a chart illustrating further example optical time-domain reflectometer signals of a monitoring system such as that shown in FIG. 20.

FIG. 25 illustrates example OTDR pulses 1022 where the door of the second enclosure 1100b (referring to FIG. 20) is opened. Prior to the door 1104 opening, the sensor system 1010 associated with the enclosure 1100b is in the first position (FIG. 23), and the OTDR pulse 1022b has a first height h1 as shown in FIG. 21. When the door 1104 of enclosure 1100b opens, the corresponding sensor system 1010 moves from the first position (FIG. 23) to the second position (FIG. 24), attenuating the reflected optical signal. Thus, the OTDR pulse 1022b is reduced to a second height h2 as shown in FIG. 25, noting an intrusion into the cabinet 1100b.

Figure 26:
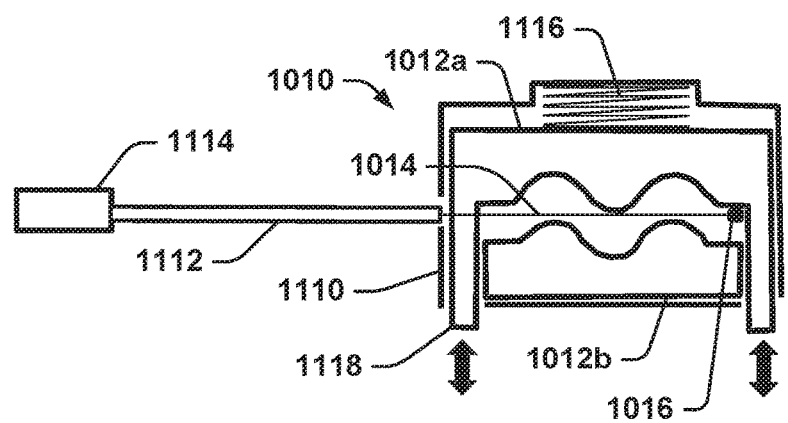
FIG. 26 is a block diagram conceptually illustrating an example of a sensor system in accordance with the present disclosure, configured to monitor the parameter of enclosure intrusion.

FIG. 26 conceptually illustrates an example of the sensor system 1010 configured to monitor the parameter of enclosure intrusion. A pigtail 1112 extends between a fiber optic connector 1114, such as an APC connector, and a shell 1110 of the sensor 1010. The fiber 1014 extends into the shell 1110, between the first and second sensor parts 1012a, 1012b with the reflector 1014 at the fiber end. As noted in conjunction with the description of FIGS. 23 and 24, the sensor parts 1012a, 1012b are situated normally in the first position (open) for enclosure intrusion implementations. In the example shown in FIG. 26, the first part 1012a is movable relative to the second part 1012b. A positioning member, such as a spring 1116 is situated between the shell 1110 and the first sensor part 1012a to push the first part 1012a towards the second part 1012b. Two legs extend from the first sensor part 1012a to form an actuator 1118. The sensor 1010 is positioned in the enclosure 1100 such that the actuator 1118 is in contact with the enclosure door 1104, so when the door 1104 is closed it pushes the actuator 1118 and thus, the first sensor part 1012a away from the second sensor part 1012b to situate the first and second parts 1012a, 1012b in the first position when the door 1104 is closed. When the door 1104 is opened, it moves away from the actuator 1118 allowing the spring 1116 to push the first sensor part 1012a towards the second sensor part 1012b, positioning the sensor 1010 in the second position so as to attenuate the OTDR signal in the manner shown and described in conjunction with FIG. 24.

The sensing system 1010 may be used in enclosures deployed in harsh environments. For such implementations, a hardened sensing system 1010 may be provided, where the sensor parts 1012 and reflector 1016 are situated in a shell 1110 having an Ingress Protection (IP) Rating of at least IP55 (dust protected and water jet protected), and the sensing system 1010 is functional for 500 cycles in a temperature range of −40° C. to +65° C., for example.

Figure 27:
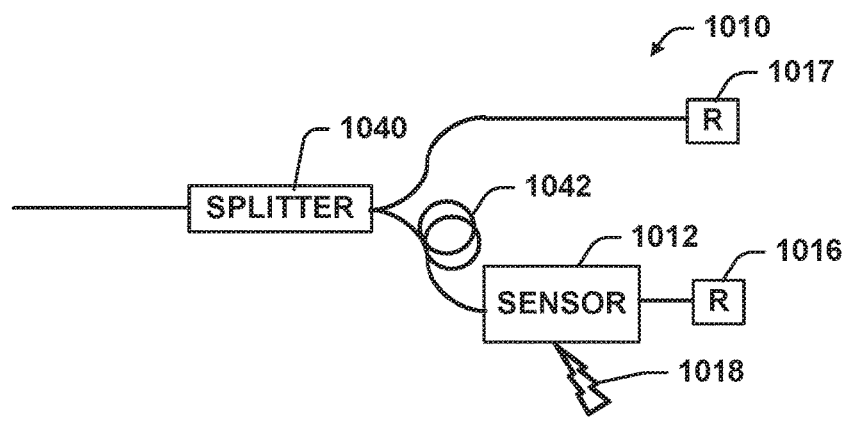
FIG. 27 is a block diagram illustrating aspects of another example of a sensor system in accordance with the present disclosure.

FIG. 27 illustrates aspects of an example of another version of the sensor system 1010 that uses a comparison of the amplitude of two reflected pulses—a reference pulse and a modulated pulse. If the OTDR pulse is compared to the signal baseline for analysis purposes, sometimes analysis errors can occur. For example, in long lines or if splices or connectors are not stable, the baseline signal can become noisy, making it difficult to compare the OTDR pulse with the baseline. This can result in false alarms.

As illustrated in FIG. 27, a 1:2 fiber optic splitter 1040 has a first terminal connected to the sensor 1012 via a delay device 1042. First and second reflectors 1016, 1017 are provided, with the first reflector 1016 being coupled to the sensor 1012 as described above. Due to the time delay device 1042, the first reflector provides a time-delayed reflected optical signal. The reflectors 1016, 1017 can be implemented by gold plated fiber ends or Bragg grating, for example. The second reflector 1017 provides a second (reference) reflected optical signal, which is compared to the time-delayed signal from the first reflector 1016 that is attenuated by the sensor 1012 based on the monitored parameter 1018. In other implementations, the delay loop can be connected between the second reflector 1017 and the splitter 1040.

Figure 28:
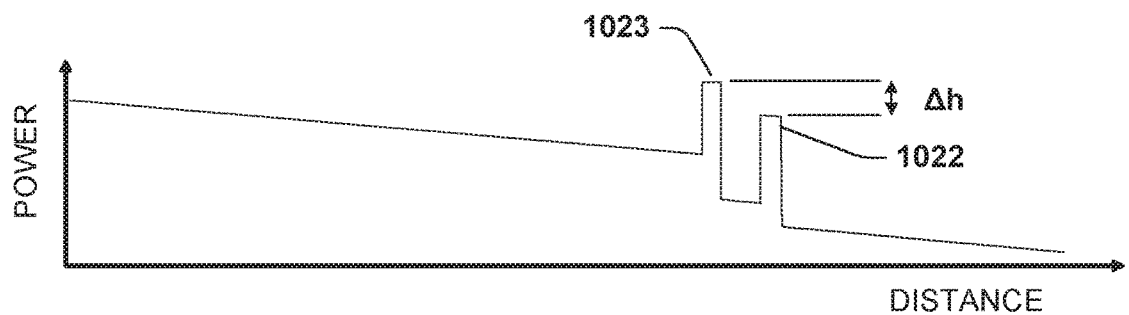
FIG. 28 is a chart illustrating example optical time-domain reflectometer signals of a sensor system such as that shown in FIG. 27.

FIG. 28 illustrates the OTDR pulses 1022, 1023 for the first and second reflectors 1016, 1017, respectively. As described above, the sensor 1012 attenuates the first reflected signal 1012 based on the monitored parameter 1018. By comparing the second, or reference, signal 1023 to the time delayed sensor signal 1022, an indication of the monitored parameter 1018 can be obtained. The difference between the first and second OTDR pulses 1022, 1023 is shown in FIG. 28 as Δh. For instance, for the example described above where enclosure intrusion is the monitored parameter, the sensor 1012 is in the first position when the enclosure door is closed. In the first position, the optical signal reflected by the reflector 1014 is not attenuated (or attenuated less than when in the second position), resulting in a first value for Δh. If the monitored parameter causes the sensor 1012 to attenuate the reflected signal, the height of the first OTDR pulse 1022 will change as compared to the second OTDR pulse 1023, causing the value of Δh to change and provide an indication of the monitored parameter. Using the Δh signal to monitor the parameter 1018 makes the sensor system measurements independent from other optical losses over the line between the sensor system 1010 and the OTDR. Thus, recalibration is not required after making changes to the network, such as splices or adding additional components.

In certain implementations, the sensing system 1010 illustrated in FIG. 27 is used in a configuration such as that shown in FIG. 20. Referring to FIGS. 20 and 27, such an implementation includes a plurality of enclosures, each with a sensor system 1010, coupled to the optical fiber 1014 via the taps 1020. A plurality of the first reflectors 1016 are each connected to a corresponding one of the sensors 1012. A plurality of the second reflectors 1017 are further provided, corresponding to each of the sensors 1012.

Figure 29:
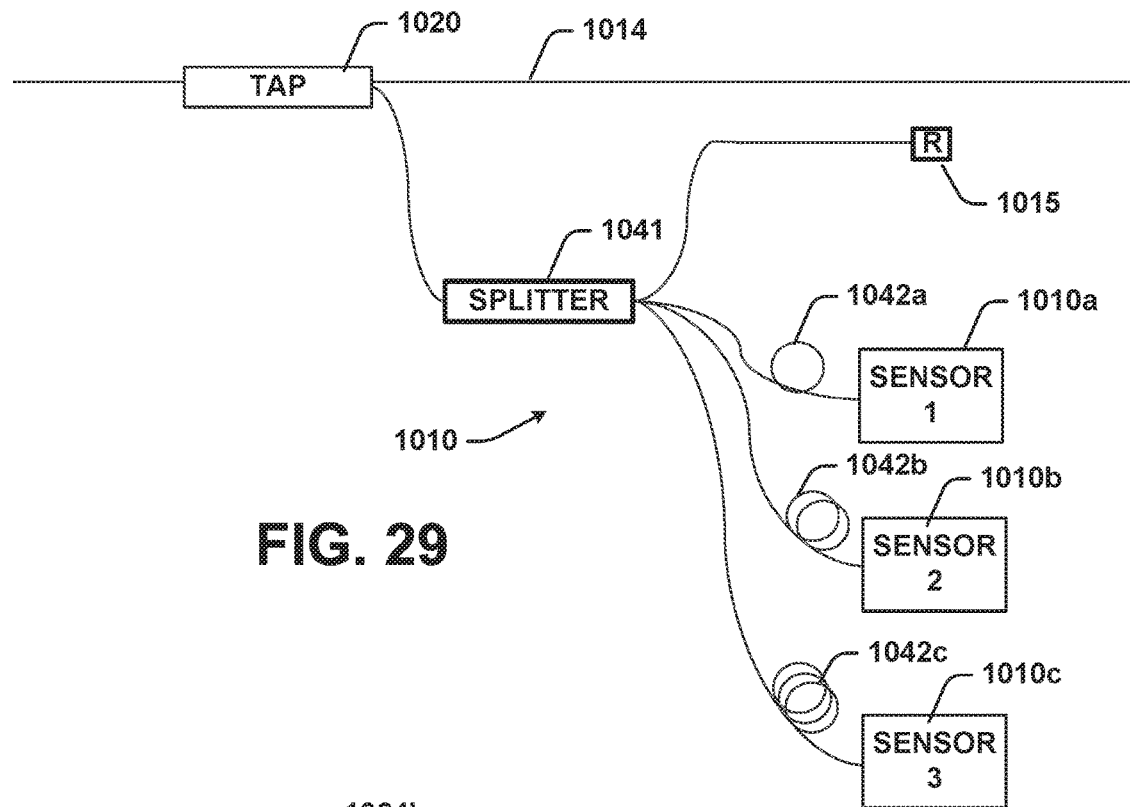
FIG. 29 is a block diagram illustrating aspects of another example of a sensor system in accordance with the present disclosure.

FIG. 29 illustrates another example where a plurality of parameters (temperature, water, humidity, intrusion) can be monitored for the same enclosure 1100 or at a single location using a single optical fiber 1014. A fiber optic tap 1020 is coupled to an optical fiber 1014 and to a 1:4 splitter 1041, which is connected to plurality of sensor systems 1010a, 1010b, 1010c. As disclosed above, each of the sensor systems 1010 includes sensor parts 1012 and a corresponding first reflector 1016 as shown, for example, in FIGS. 23 and 24. Each of the sensors 1010a, 1010b, 1010c is connected to the splitter 1040 via a corresponding time delay device such as delay loops 1042a, 1042b, 1042c, with each delay loop having a different length to delay the OTDR signal a different time period for each reflected signal. The second reflector 1016 is further coupled to the splitter 1040 to provide a reference signal. In some implementations, each sensor monitors a different parameter 1018a, 1018b, 1018c. A comparison of the reflected optical signals from each of the sensors 1010a, 1010b, 1010c to the second optical signal from the reference reflector 1017 provides an indication of the plurality of monitored parameters.

For example, the sensor system 1010 could monitor three doors of a single enclosure, or a variety of other parameters such as humidity, intrusion and temperature for a single enclosure. Humidity or moisture sensors could be formulated using a material that swells or expands in response to moisture. As the material swells, it presses an optical fiber in a "sawtooth" cavity or a cavity with radiused curves similar to that shown in FIGS. 23 and 24. A temperature sensor can be formed using a bi-metal structure that similarly deforms s fiber in response to temperature variation.

Figure 30:
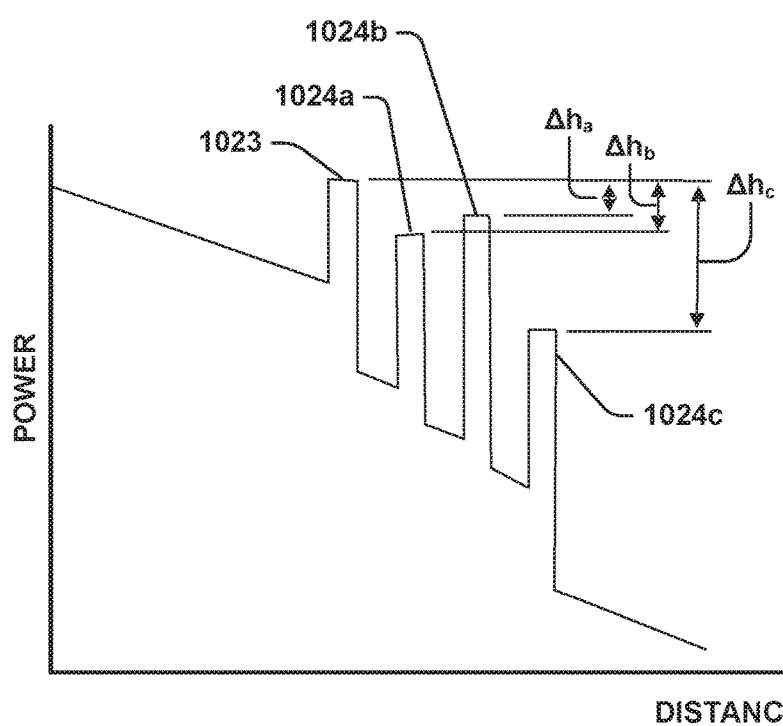
FIG. 30 is a chart illustrating example optical time-domain reflectometer signals of a sensor system such as that shown in FIG. 29.

FIG. 30 illustrates examples of various OTDR signals generated by the system shown in FIG. 29. The pulse 1023 is the reference pulse from the reflector 1017, and the other three pulses 1024a, 1024b, 1024c correspond to the signals reflected from the reflectors associated with the sensors 1010a, 1010b, 1010c. As noted above, each of the sensors 1010a, 1010b, 1010c is coupled to the splitter 1040 via a respective delay loop 1042a, 1042b, 1042c, so the OTDR pulses associated with the respective sensors are spaced along the distance axis. Comparing each of the sensor pulses 1024a, 1024b, 1024c to the reference pulse 1023 results in a corresponding Δh signal, Δha, Δhb, Δhc. When the monitored parameter 1018 changes, it results in the respective sensor attenuating the reflected signal, which in turn changes the pulse height as compared to the reference pulse 1023.

Those skilled in the art can understand that the embodiments described above are exemplary and can be improved by those skilled in the art, and that the structures described in the embodiments can be freely combined without producing a conflict in terms of structure or principles, so as to realize more types of optical sensors, optical sensor assemblies and monitoring devices while solving the technical problems of the present invention.

After the preferred embodiments of the present invention have been described in detail, those skilled in the art can clearly understand that various changes and modifications can be made without departing from the protective scope and spirit of the appended claims and the invention is also not limited to the practice of the exemplary embodiments set forth in the description.

PARTS LIST 11 holding sleeve
12 fixed ferrule
13 movable ferrule
14 reflection part
15 actuation part
16 reset device 17 limiting part
21 holding sleeve
22 fixed ferrule
23 movable ferrule
24 reflection part
25 actuation part
26 reset device
27 main body frame
28 guide frame
29 housing
31 holding sleeve
32 fixed ferrule
33 movable ferrule
34 reflection sleeve
35 actuation part
36 reset device
37 main body frame
38 guide frame
39 housing
100 optical sensor
101 optical cable transmission device
102 optical cable
103 first optical fiber connector
121 optical fiber hole
131 optical fiber hole
200 optical sensor
221 device
251 limiting part
252 guide protrusion
271 base part
272 sleeve holder
273 extension arm
274 engagement protrusion
281 end part
282 hole
283 guide groove
284 engagement groove
285 positioning frame
291 mounting part
292 mounting hole
300 optical sensor
391 flexible connection part
400 monitoring device
405 main optical cable transmission device
406 optical time domain reflectometer
407 service network
408 shunt
500 monitoring device
506 optical time domain reflectometer
508 shunt
600 monitoring device
604 splitter
606 optical time domain reflectometer
608 shunt
700 monitoring device
703 one optical switch
704 one shunt
705 main optical cable transmission device
706 optical time domain reflectometer
708 one shunt
800 monitoring device
806 optical time domain reflectometer
808 multiple splitters
1010 sensor system
1012 sensor
1012a first sensor part
1012b second sensor part
1014 optical fiber
1016 reflector
1017 second reflector
1018 parameter
1018a parameter
1018b parameter
1018c parameter
1020 fiber optic tap coupler
1022 pulse
1022a pulse
1022b pulse
1022c pulse
1023 pulse
1024 pulse
1024a pulse
1024b pulse
1024c pulse
1030 OTDR
1031 light path
1032 incoming light
1034 reflected light
1040 fiber optic splitter
1042 delay device
1042a delay loops
1042b delay loops
1042c delay loops
1050 monitoring system
1100 enclosure
1100a enclosure
1100b enclosure
1100c enclosure
1102 enclosure housing
1104 door
1110 shell
1112 pigtail
1114 fiber optic connector
1116 spring
1118 actuator

What is claimed is:

1. An optical sensor assembly, comprising:
an optical sensor including:
a holding sleeve;
a fixed ferrule fixedly mounted in said holding sleeve;
a movable ferrule movably mounted in said holding sleeve, a predetermined distance existing between a first movable end of said movable ferrule and a first fixed end of said fixed ferrule in said holding sleeve;
a reflection part arranged at a second movable end of said movable ferrule opposite to said first movable end, for reflecting light entering the movable ferrule; and
an actuation part, said actuation part being constructed to drive said movable ferrule to move so that said first movable end moves towards said first fixed end;
an optical cable transmission device, constructed to be optically coupled to a second fixed end of said fixed ferrule, for transmitting light incident to said fixed ferrule and light reflected from said reflection part.

2. The optical sensor assembly of claim 1, wherein a first end of an optical cable of said optical cable transmission device is provided with a first optical fiber connector, and a second end of the optical cable of said optical cable transmission device is directly optically coupled with the second fixed end of said fixed ferrule.

3. The optical sensor assembly of claim 1, wherein a first end of an optical cable of said optical cable transmission device is provided with a first optical fiber connector, and a second end of the optical cable of said optical cable transmission device is optically coupled with the second fixed end of said fixed ferrule through a second optical fiber connector.

4. A sensor system, comprising:
a first reflector configured to provide a first reflected optical signal;
a sensor having a first position and a second position, the second position configured to attenuate the first reflected optical signal more than the first position, the sensor being configured to move between the first and second positions in response to a monitored parameter;
wherein a change in the attenuation of the first reflected optical signal provides an indication of the monitored parameter.

5. The sensor system of claim 4, further comprising:
a second reflector configured to provide a second reflected optical signal;
wherein a comparison of the first and second reflected optical signals provides an indication of the monitored parameter.

6. The sensor system of claim 5, further comprising a time delay device connected to either the sensor or the second reflector.

7. The sensor system of claim 4, further comprising an optical time-domain reflectometer (OTDR) configured to receive the reflected optical signals.

8. The sensor system of claim 4, further comprising: an optical fiber;
a plurality of the sensors;
a plurality of the first reflectors, each of the first reflectors having a corresponding one of the sensors;
a plurality of fiber optic taps, each of the fiber optic taps coupled to the optical fiber and a corresponding sensor and first reflector.

9. The sensor system of claim 4, further comprising: an optical fiber;
a plurality of the sensors;
a plurality of the first reflectors configured to provide a plurality of the first reflected optical signals, each of the first reflectors having a corresponding one of the sensors;
a plurality of time delay devices;
a fiber optic splitter arranged to couple the optical fiber to each of the sensors and first reflectors via a corresponding one of the time delay devices; and
wherein a change in the attenuation of the first reflected optical signals provides an indication of the corresponding monitored parameter.

10. The sensor system of claim 4, wherein:
the sensor includes first and second parts; the first and second parts are spaced apart by a first distance when in the first position; and
the first and second parts are spaced apart by a second distance less than the first distance when in the second position.

11. The sensor system of claim 10, wherein the first and second parts each include an inner surface defining a radius (R).

12. The sensor system of claim 10, wherein the first and second parts each include a ferrule and at least one of the ferrules is moveable toward the other ferrule.

13. A method of monitoring an enclosure, comprising:
providing a first reflected optical signal from an enclosure;
changing the attenuation the first reflected optical signal in response to a monitored parameter; and
monitoring the attenuation of the first reflected optical signal.

14. The method of claim 13, further comprising:
providing a second reflected optical signal from the enclosure;
time delaying one of the first or second reflected optical signals;
comparing the first and second reflected optical signals to obtain an indication of the monitored parameter.

15. The method of claim 13, further comprising:
providing a sensor system having first and second parts, the first part being movable relative to the second part; and
moving the first part towards the second part to attenuate the first reflected optical signal.

16. The method of claim 13, wherein the monitored parameter is enclosure intrusion, the method further comprising:
moving the first part towards the second part to attenuate the first reflected optical signal in response to a door of the enclosure housing.

17. The method of claim 13, further comprising:
providing a plurality of the first reflected optical signals from the enclosure, each of the first reflected optical signals corresponding to a monitored parameter time delaying each of the first reflected optical signals by a different time period;
attenuating the first reflected optical signals in response to the corresponding monitored parameters;
comparing each of the first reflected optical signals to the second reflected optical signal to obtain indications of the monitored parameters.

18. The method of claim 13, further comprising:
providing a plurality of the first reflected optical signals from a corresponding plurality of enclosures; and
providing a plurality of the second reflected optical signals from the corresponding plurality of enclosures.

19. The method of claim 13, wherein the monitored parameter includes at least one of enclosure intrusion, temperature, water, and humidity.

* * * * *